United States Patent
Duke et al.

(10) Patent No.: US 9,254,682 B2
(45) Date of Patent: *Feb. 9, 2016

(54) IMAGING MODULE WITH ALIGNED IMAGING SYSTEMS

(71) Applicant: Eastman Kodak Company, Rochester, NY (US)

(72) Inventors: Ronald J. Duke, Centerville, OH (US); James Alan Katerberg, Kettering, OH (US)

(73) Assignee: EASTMAN KODAK COMPANY, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/064,408

(22) Filed: Oct. 28, 2013

(65) Prior Publication Data
US 2015/0116412 A1    Apr. 30, 2015

(51) Int. Cl.
B41J 29/393  (2006.01)
G06K 9/34    (2006.01)
B41J 3/60    (2006.01)
G06T 7/00    (2006.01)
B41J 11/00   (2006.01)

(52) U.S. Cl.
CPC ... B41J 3/60 (2013.01); B41J 11/008 (2013.01); G06T 7/003 (2013.01)

(58) Field of Classification Search
CPC ............................................. G06T 7/003
USPC ........................................... 356/611
See application file for complete search history.

(56) References Cited

U.S. PATENT DOCUMENTS

| | | | |
|---|---|---|---|
| 4,847,775 A | 7/1989 | Roch et al. | |
| 5,991,046 A | 11/1999 | Shakespeare et al. | |
| 6,549,289 B1* | 4/2003 | Ellis | 356/603 |
| 7,295,223 B2 | 11/2007 | Jung | |
| 7,394,475 B2 | 7/2008 | Bradley et al. | |
| 8,931,865 B1* | 1/2015 | Duke et al. | 347/3 |
| 2003/0210407 A1* | 11/2003 | Xu | 356/611 |
| 2010/0329756 A1 | 12/2010 | Mizes | |
| 2012/0212603 A1* | 8/2012 | Lindee et al. | 348/89 |
| 2013/0050329 A1 | 2/2013 | Duke et al. | |
| 2013/0050763 A1 | 2/2013 | Duke et al. | |

* cited by examiner

Primary Examiner — Shelby Fidler
(74) Attorney, Agent, or Firm — Kevin E. Spaulding

(57) ABSTRACT

An imaging module including a plurality of imaging systems for capturing images of a receiver medium. An illumination system illuminates the receiver medium with an illumination pattern. First and second imaging systems are positioned to capture images of the receiver medium, each including at least a portion of the illumination pattern. The first and second images are analyzed to determine a relative position of the illumination pattern in the first and second images. Imaging system alignment parameters for use in aligning images captured with the first and second imaging systems are determined responsive to the determined relative position.

21 Claims, 13 Drawing Sheets

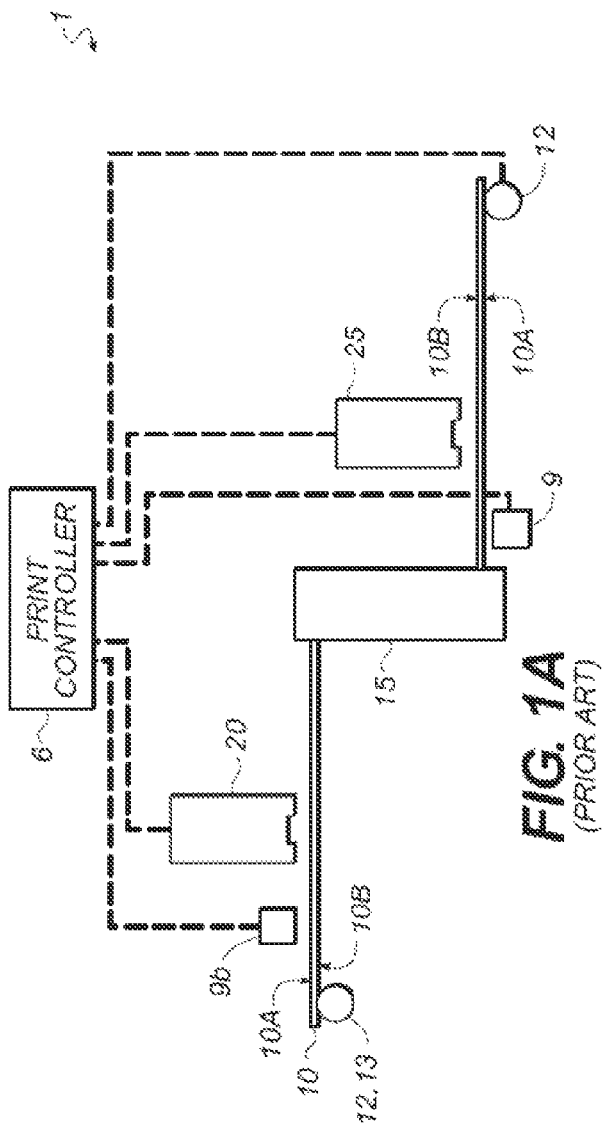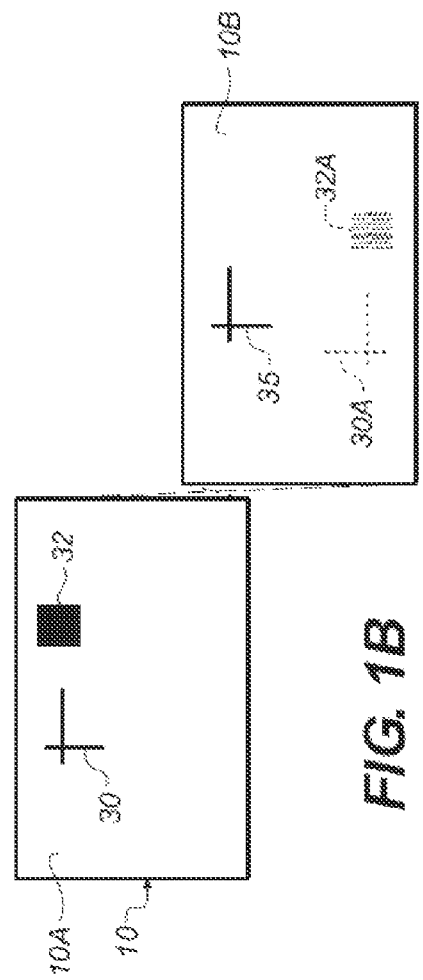

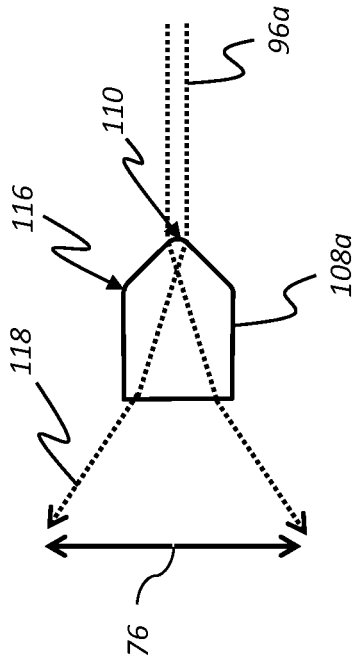
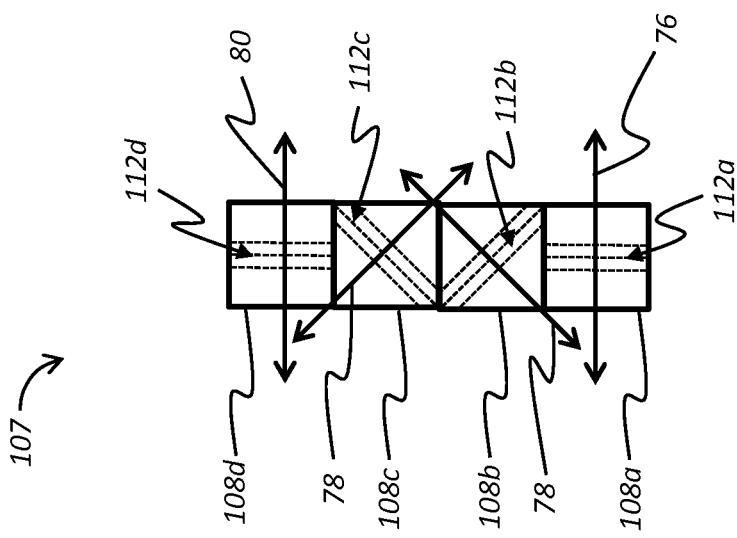
FIG. 10
FIG. 9

IMAGING MODULE WITH ALIGNED IMAGING SYSTEMS

CROSS REFERENCE TO RELATED APPLICATIONS

Reference is made to commonly assigned, U.S. patent application Ser. No. 14/064,389, now U.S. Pat. No. 8,931,865, entitled: "Printer with front and back imaging systems", by Duke et al.; and to commonly assigned, co-pending U.S. patent application Ser. No. 14/064,443, entitled: "Method for aligning imaging systems", by Duke et al., each of which is incorporated herein by reference.

FIELD OF THE INVENTION

This invention relates generally to the field of digitally controlled printing systems, and in particular to the registration of imaging systems used in the alignment of patterns, for example, images or text, printed by these systems.

BACKGROUND OF THE INVENTION

Many printing systems are configured to print on both a front side and a back side of a receiver medium. Typically, a pattern (e.g., an image or text) is printed on the front side of the receiver medium using one portion of the printing system. After transportation of the receiver medium to another portion of the printing system, a second pattern (e.g., an image or text) is printed on the back side of the receiver medium.

As ink is applied to the receiver medium by the printheads of the printing system, it is absorbed by the receiver medium, and typically causes the receiver medium to expand. This expansion occurs in both in-track and cross-track directions, and often varies with position on the receiver medium. Expansion of the receiver medium often adversely affects the alignment of the receiver medium relative to the media transport of the printing system, which can lead to a reduction in print quality. Additionally, the absorption of ink by the receiver medium, often in combination with the environment in which the printing system is operated (e.g., temperature or humidity conditions), often causes the receiver medium to stretch during printing which can lead to a further reduction in print quality.

In order to achieve an acceptable level of print quality, patterns printed, for example, on the front side of a receiver medium should be properly registered with patterns printed on the back side of the receiver medium.

U.S. Pat. No. 7,295,223 to Jung, entitled "Method and apparatus for adjusting an image alignment for an image forming apparatus," describes a method for adjusting image alignment in a printer that uses thermal printed heads to print on both sides of a medium. A first printed pattern on the first side of the medium and a second printed pattern on the second side of the medium are detected by sensor. A position deviation is determined and used to adjust print zone positions.

U.S. Pat. No. 7,394,475 to Bradley et al., entitled "Apparatus, system, and method for image registration," describes a method of print registration which involves printing first and second registration marks. A sensor module detects registration by detecting the light transition as the first registration mark passes a first optical channel module and as the second registration mark passes a second optical channel module. In some configurations, the first and second registration marks are printed on opposite sides of the page.

U.S. Patent Application Publication 2010/0329756 to Mizes, entitled "Duplex web printer system registration technique," describes a method for registering images printed on opposite sides of a receiver. Registration marks are printed on both sides of the receiver. A sensor on one side of the receiver is used to detect both sets of marks by transmitting light through the receiver.

Commonly-assigned U.S. Patent Application Publication 2013/0050329 to Duke et al., entitled "Registering patterns on multiple media sides," and related U.S. Patent Application Publication 2013/0050763 to Duke et al., entitled "Multiple sided media pattern registration system," describe a method for aligning patterns printed on both sides of a receiver. A first camera is positioned to capture an image of a first side of the media including a first printed pattern, and a second camera is positioned to capture an image of a second side of the media including a second printed pattern. A two-sided fiducial is provided adjacent to an edge of the media within the field-of-view of both cameras. Locations of the fiducial are detected in the captured images and used to define a fiducial origin in each of the images. The locations of the printed patterns are determined in each image relative to the fiducial origins, and are used to adjust the registration of subsequently printed images. This approach has the disadvantage that it requires hardware to reposition the cameras, or it requires some of the fields-of-view of the cameras to be devoted to imaging regions outside of the printed media.

There remains an ongoing need to improve the registration of patterns printed by printing systems.

SUMMARY OF THE INVENTION

The present invention represents an imaging module including a plurality of imaging systems for capturing images of a receiver medium, comprising:
an illumination system for illuminating the receiver medium with light providing an illumination pattern;
a first imaging system positioned to capture an image of at least a portion of the receiver medium, the first imaging system having a field-of-view that includes at least a portion of the illumination pattern;
a second imaging system positioned to capture an image of at least a portion of the receiver medium, the second imaging system having a field-of-view that includes at least a portion of the illumination pattern;
a data processing system; and
a program memory communicatively connected to the data processing system and storing instructions configured to cause the data processing system to implement a method for aligning the first and second imaging systems, wherein the method includes:
  using the first imaging system to capture a first image of the receiver medium, the first image including at least a portion of the illumination pattern;
  using the second imaging system to capture a second image of the receiver medium, the second image including at least a portion of the illumination pattern;
  analyzing the captured first and second images to determine a relative position of the illumination pattern in the first and second images;
  determining one or more imaging system alignment parameters responsive to the determined relative position; and
  storing the determined imaging system alignment parameters in a processor-accessible memory for subsequent use in aligning images captured with the first imaging system with images captured with the second imaging system.

This invention has the advantage that the imaging systems can be aligned without the need for using any printed registration marks.

It has the additional advantage that the position of the illumination pattern is independent of the position of the receiver medium and is viewable from either side of the receiver medium.

It has the further advantage that the aligned imaging systems can be used to capture images of printed patterns produced by a printing system in order to facilitate alignment of the printing system.

BRIEF DESCRIPTION OF THE DRAWINGS

FIG. 1A is a schematic side view of a conventional printing system used for printing on a front side and a back side of a receiver medium;

FIG. 1B illustrates a receiver medium having a first pattern printed on the first side of the receiver medium and a second pattern printed on the second side of the receiver medium;

FIG. 9 shows a view of the line generator assembly of FIG. 8 as viewed along line B-B;

FIG. 10 shows a cross-section of a Powell lens from FIG. 8 as viewed along line C-C;

Figure 2:
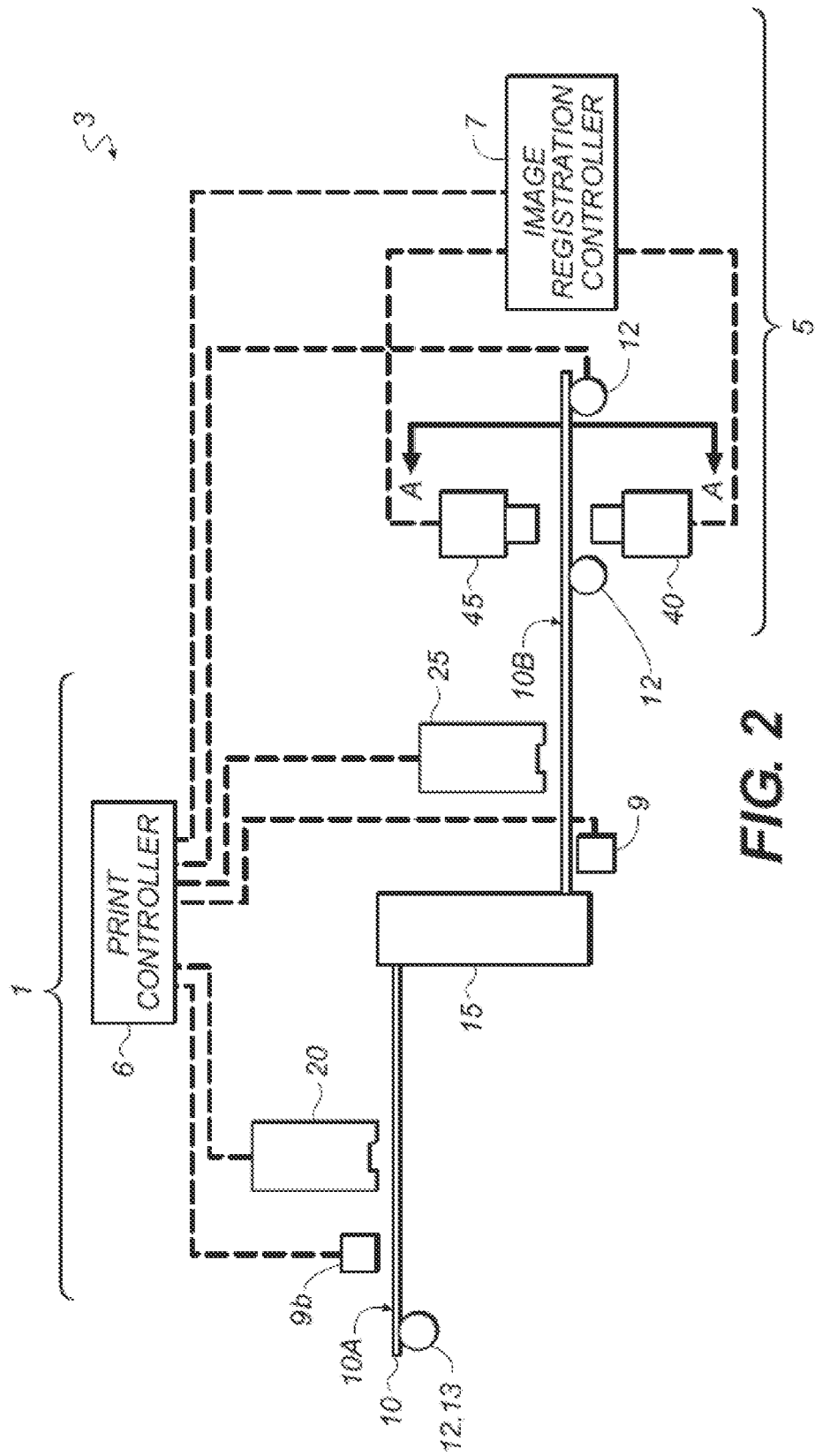
FIG. 2 is a schematic side view of a digital printing system including an image registration system for registering the first pattern printed on the first side of the receiver medium with the second pattern printed on the second side of the receiver medium according to one embodiment of the invention.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The present description will be directed in particular to elements forming part of, or cooperating more directly with, apparatus in accordance with the present invention. It is to be understood that elements not specifically shown or described may take various forms well known to those skilled in the art. In the following description and drawings, identical reference numerals have been used, where possible, to designate identical elements.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

The use of singular or plural in referring to the elements and components is not limiting. Additionally, references such as first, second, etc. are intended for reference purposes only, and should not be interpreted to mean that any specific order is intended or required for the present disclosure to function properly. It should be noted that, unless otherwise explicitly noted or required by context, the word "or" is used in this disclosure in a non-exclusive sense.

The example embodiments of the present invention are illustrated schematically and not to scale for the sake of clarity. One of ordinary skill in the art will be able to readily determine the specific size and interconnections of the elements of the example embodiments of the present invention.

Inkjet printing involves a non-contact application of an ink to a receiver medium. Typically, one of two types of inkjetting mechanisms are used and are categorized by technology as either "drop-on-demand inkjet" (DOD) or "continuous inkjet" (CIJ). The first technology, drop-on-demand inkjet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal inkjet" (TIJ).

The second technology, commonly referred to as continuous inkjet printing, uses a pressurized ink source to produce a continuous liquid stream of ink by forcing ink, under pressure, through a nozzle. The stream of ink is perturbed using a drop forming mechanism such that the liquid jet breaks up into drops of ink in a predictable manner. One continuous inkjet printing technology uses thermal stimulation of the liquid stream with a heater to form drops that eventually become print drops and non-print drops. Printing occurs by selectively deflecting the print drops and the non-print drops and catching the non-print drops. Various approaches for selectively deflecting drops have been developed including electrostatic deflection, air deflection and thermal deflection.

The invention described herein is suitable for use with either type of inkjet printing process, or with other types of digital printing processes including, for example, flow through liquid dispensing processes, electrophotographic printing processes or thermal printing processes.

As described herein, the example embodiments of the present invention provide printing systems or registration systems typically used in inkjet printing systems. However, many other applications are emerging which use inkjet printheads to emit liquids (other than inks) that need to be finely metered and deposited with high spatial precision. In addition to inks (e.g., water-based inks or solvent-based inks) that include one or more dyes or pigments, these liquids can also include various substrate coatings and treatments, various medicinal materials, and functional materials useful for forming, for example, various circuitry components or structural components. Examples of medicinal materials include those applied to dermal and transdermal medicinal patches, used to deliver a specific dose of medication to the skin or through the skin. As such, as described herein, the terms "liquid" and "ink" refer to any material that is ejected by the printing systems or printhead described below. Additionally, the term receiver medium is intended to include various media types, including, for example, paper, paperboard, cardboard, vinyl, medicinal patch substrates, materials used in the packaging of foods, clothing, and other consumer goods, such as plastic bag stock, and substrates used in printed circuitry, such as polyimide (including Kapton®), PEEK, and transparent conductive polyester.

Referring to FIG. 1A, a conventional printing system 1 for printing on a first side 10A and a second side 10B of a receiver medium 10 is shown. An isometric view of the receiver medium 10 is shown in FIG. 1B. The printing system 1 includes a print controller 6 that controls a first printhead 20 and a second printhead 25. The receiver medium 10 is transported through the printing system 1, relative to the first and second printheads 20, 25, via a media transport system 12 that is also controlled by print controller 6.

The receiver medium 10 is a continuous strip of media, commonly referred to as a continuous web of receiver medium, which is caused to move along a travel path through media transport system 12. The media transport system 12 typically includes drive rollers, web guide rollers, and web tension devices. The receiver medium 10 is routed through the media transport system 12, and tension within the media transport system 12 provides friction between the drive rollers and the receiver medium 10 to prevent slipping. As such, each rotation of the drive rollers can be correlated to a linear length or travel of receiver medium 10 that has been transported within the printing system 1. Typically, at least one of the rollers includes an encoder 13 which creates a defined number of pulses per revolution of the drive roller. The circumference of the drive roller and the defined number of pulses per revolution of the encoder 13 are used by the print controller 6 to determine the receiver medium travel within the printing system 1.

As the receiver medium 10 is transported through the printing system 1, the first side 10A of the receiver medium 10, commonly referred to as a front side, passes beneath the first printhead 20 for printing a first-side image. The receiver medium 10 is subsequently inverted by a turnover mechanism 15, such that the second side 10B of the receiver medium 10, sometimes referred to as a back side, faces a second printhead 25 for printing a second-side image. In some embodiments, the first printhead 20 prints a cue mark 32 (shown in FIG. 1B) on the first side 10A of the receiver medium 10. After the receiver medium 10 is inverted by the turnover mechanism 15, there is a cue sensor 9 that communicates with the print controller 6 upon sensing the cue mark 32, providing the print controller 6 with a reference point from which to determine the receiver medium position. The cue sensor 9 is typically a photo diode or other light sensitive device, camera, or image capture device that is capable of sensing the difference in light reflected off of the blank receiver medium 10 versus the light reflected from the printed cue mark 32. Alternatively, the receiver medium 10 can include pre-printed cue marks that are sensed by the cue sensor 9. When pre-printed cue marks are included on receiver medium 10, another cue sensor 9b can be used to detect the cue mark to enable the first side image to be positioned relative to the pre-printed cue mark.

Referring to FIG. 1B, receiver medium 10 includes a first pattern 30 printed on the first side 10A of the receiver medium 10 at a first target location and a second pattern 35 printed on the second side 10B of the receiver medium 10 at a second target location. Each target location is defined with an in-track location along the direction of media travel and a cross-track location perpendicular to the direction of media travel. The in-track location is used to refer to the location along the length of the receiver medium 10, whereas the cross-track location is used to refer to the location across the width of the receiver medium 10. An inverted first pattern 30A and an inverted cue mark 32A shows the positions of the first pattern 30 and the cue mark 32, respectively, as viewed from the second side 10B. The first and second target locations have a corresponding relative position, which includes a relative in-track location and a relative cross-track location.

The process for positioning the print in the in-track direction differs from the process for positioning the print in the cross-track direction. As the receiver medium 10 is transported through the printing system 1, the first and second target in-track locations on the receiver medium are moving relative to the printheads. The first printhead 20 and the second printhead 25 are cued to print when the appropriate first and second in-track target locations are passing beneath them. As such, the print controller 6 determines a first cue time, accounting for the flight time of the print drops from the printhead to the receiver medium, when the first target in-track location is passing beneath the first printhead 20. At the first cue time, the first printhead 20 is cued to print the first pattern 30.

After the first pattern 30 is printed and the receiver medium 10 is transported through the printing system 1, the print controller 6 determines the receiver medium 10 travel between the first and second printheads 20, 25, in order to determine a second cue time, when the second target in-track location is passing beneath the second printhead. At the second cue time, the second printhead 25 is cued to print the second pattern 35.

As the receiver medium 10 is transported along the transport path, the print controller 6 signals the first printhead 20 to print the cue mark 32 and after an appropriate cue delay (a first cue delay) to print the first pattern 30. The cue delay is normally measured in terms of a number of encoder pulses. After the receiver medium 10 is inverted by the turnover mechanism 15, the inverted cue mark 32A passes and is detected by the cue sensor 9. After an appropriate cue delay (a second cue delay), which accounts for the distance between the cue sensor 9 and the second printhead 25, as well as the desired placement of the second pattern 35 relative to the inverted cue mark 32A, the second printhead 25 prints the second pattern 35.

While printing at in-track target locations depends on tracking the motion of the receiver medium 10 as it travels through the printing system 1, printing at the first and second cross-track target locations depends on the mechanical cross-track alignment of the first printhead 20 and the second printhead 25 relative to the receiver medium 10, and can be adjusted by controlling which nozzles in the first printhead 20 and the second printhead 25 are used for printing. Typically, the first printhead 20 and the second printhead 25 include overlapping nozzle arrays that cover the cross-track width of the receiver medium 10. The print controller 6 controls which nozzles are selected to jet ink onto the receiver medium 10 in order to print at the first and second cross-track target locations.

As ink is jetted onto the receiver medium 10, it is absorbed, causing the receiver medium 10 to expand in both in-track and cross-track directions. Drying the ink on the receiver medium typically involves the application of heat to the receiver medium, drying not only the ink, but also causing the moisture content of the non-printed portions of the receiver medium 10 to drop. As the moisture content of the receiver medium 10 drops, in both the printed and non-printed regions, the receiver medium 10 typically shrinks in both the in-track and cross-track directions. In-track expansion causes the receiver medium 10 to increase in length, which affects the determination of the receiver medium 10 travel, because the encoder 13 within the media transport system 12 has a fixed circumference and defined number of pulses per revolution. Due to the increase in length of the receiver medium 10, more revolutions of the encoder 13 within the media transport system 12 would be required in order to compensate for the increased length of the receiver medium 10. Absent any compensation, when the print controller 6 cues the second printhead 25 to print the second pattern 35, the receiver medium 10 travel would be less than would be required for the correct relative in-track location between the first pattern 30 and the second pattern 35. As such, the registration of second pattern 35 and the first pattern 30 would be incorrect.

Compensating for expansion is further complicated by differences in print coverage. For example, if the first pattern 30 printed on the first side 10A of the receiver medium 10 requires heavy coverage and the second side 10B requires only light coverage, the receiver medium 10 will expand at different rates. Additionally, when the coverage area varies in the cross-track direction, the in-track expansion will vary across the receiver medium 10. This can cause the receiver medium 10 to drift in the cross-track direction as the receiver medium 10 moves along the media transport system 12, as the tension is not uniform across the drive rollers. As the receiver medium 10 drifts, the cross-track locations of the first pattern 30 and the second patterns 35 are affected. The in-track expansion variations can also lead to a skew in the receiver medium approaching a printhead. This can produce a skew in the printed image.

Additionally, operating conditions such as temperature and humidity, can also affect the receiver medium 10 expansion. As the printing system 1 warms up, or as operation conditions change, the temperature and humidity within the printing system 1 will change. This can affect factors such as ink absorption and the rate at which the ink dries, thus affecting the both in-track and cross-track expansion.

The printing system 1 will generally include features for calibration, for example during initial setup or maintenance cycles, in order to ensure registration of the first pattern 30 and the second pattern 35. Calibration typically requires the printing of test patterns to characterize attributes such as the mechanical position of components, the time of flight of the ink drops, the rate of receiver medium travel. The system can be calibrated by making various mechanical or electrical adjustments of components, and adjusting various parameters such as cue delays and nozzle offset. However, this type of calibration often necessitates that the printing system 1 be offline. The issues described above, however, often occur during normal printing operation after calibration. As such, it is often necessary to determine and calibrate the registration of the first pattern 30 and the second pattern 35, not only during initial installation and setup of the printing system 1, but during normal printing operations.

As described herein, example embodiments of the present invention include printing systems, components and methods for determining the registration of patterns, for example, images or text printed, on a first side and a second side of a receiver medium.

Referring to FIG. 2, a digital printing system 3 is shown that includes an image registration system 5 for registering images printed by the printing system 1 on the first side 10A and the second side 10B of the receiver medium 10, in addition to the components described above with reference to FIG. 1A. The image registration system 5 includes a first imaging system 40 and a second imaging system 45 located downstream of the second printhead 25. The first imaging system 40 is positioned to view and capture images of at least a portion of the first side 10A of the receiver medium 10, and the second imaging system 45 is positioned to view and capture images of at least a portion of the second side 10B of the receiver medium 10. The first imaging system 40 is sometimes referred to as the first camera, and the second imaging system 45 is sometimes referred to as the second camera. The first imaging system 40 and the second imaging system 45 transfer the captured images to an image registration controller 7, which processes the images and transmits data related to the relative placement of the first and second side printed images to the print controller 6, enabling the print controller to correct the registration of subsequently printed patterns on the first side 10A and second side 10B of the receiver medium 10.

Figure 3:
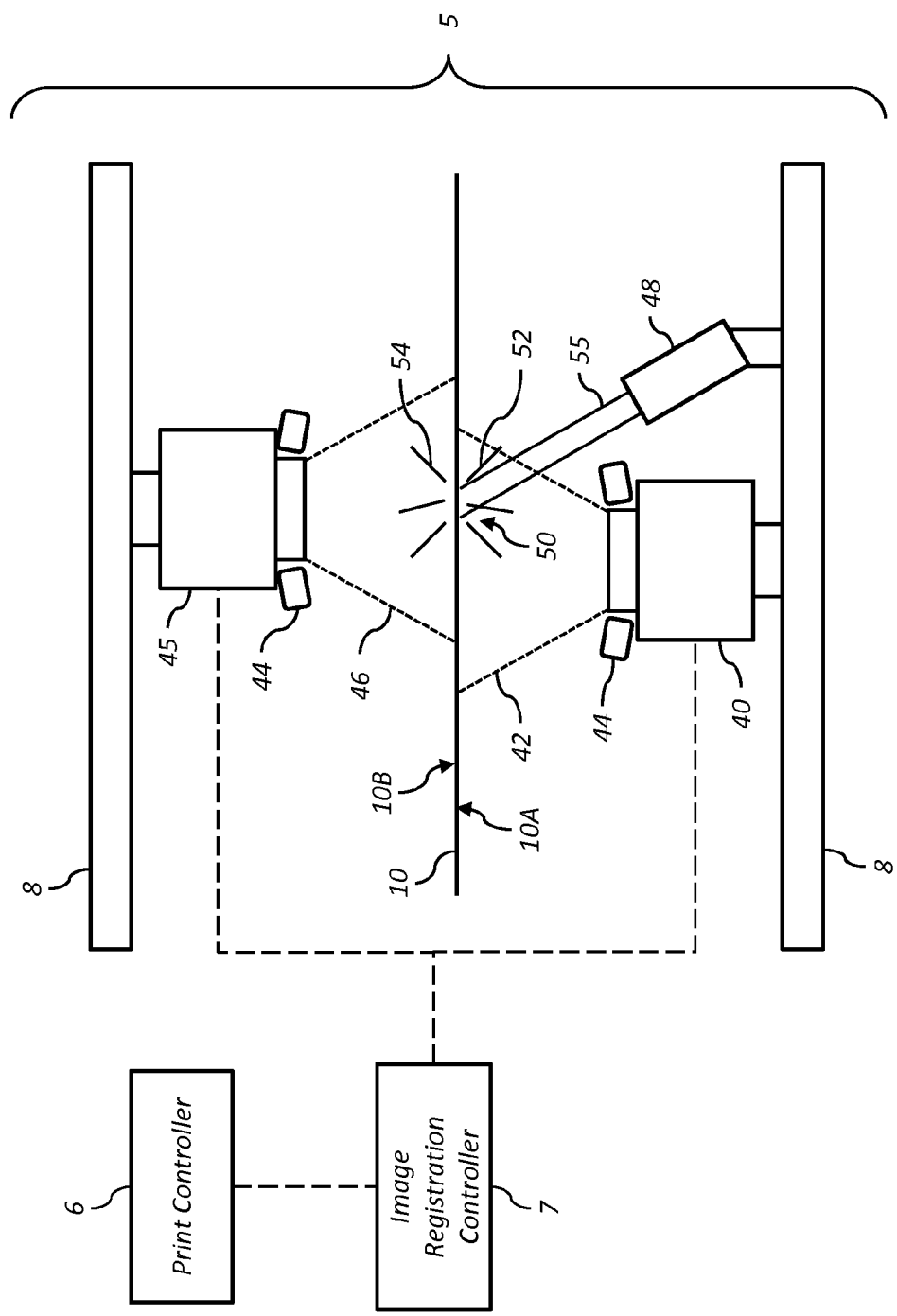
FIG. 3 is a schematic cross-section view of the image registration system of FIG. 2 taken along line A-A.

Referring to FIG. 3, an example embodiment of the image registration system 5 is shown, as viewed along line A-A in FIG. 2. The first imaging system 40 has a first field-of-view 42 and is positioned below the receiver medium 10 so that it can capture images of at least a portion of the first side 10A of the receiver medium 10, and the second imaging system 45 has a second field-of-view 46 and is positioned above the receiver medium 10 so that it can capture images of at least a portion of the second side 10B of the receiver medium 10. In this arrangement, the first pattern 30 (FIG. 1B) is printed within the portion of the first side 10A of the receiver medium 10 that is captured by the first field-of-view 42 of the first imaging system 40, and the second pattern 35 (FIG. 1B) is printed within the portion of the second side 10B of the receiver medium 10 that is captured by the second field-of-view 46 of the second imaging system 45.

In the illustrated embodiment, light sources 44 are associated with both the first imaging system 40 and the second imaging system 45 to provide the light needed for the cameras to acquire images of the patterns printed on the receiver medium 10. In some embodiments, the light sources 44 are strobed light sources synchronized with the motion of the receiver medium 10 that produce light pulses of short enough time duration to enable images to be captured by the first imaging system 40 and the second imaging system 45 without blur. One common form of strobed light source is an LED strobed light source, having an array of strobed red, green and blue LEDs, the combined output of which yields a neutral white illumination. In an alternate embodiment, the light sources 44 are not strobed, and the first imaging system 40 and the second imaging system 45 use an image capture exposure times sufficiently short to enable blur free images to be captured. The first imaging system 40 and the second imaging system 45, which may be cameras or other imaging devices, are attached to structural components 8, so that these components do not move relative to each other during printing operations. Appropriate adjustment features to accommodate for installation and mechanical alignment, however, can be included.

Referring back to FIG. 2, in some exemplary embodiments of the invention, one or more components of the media transport system 12, (e.g., rollers) are located near the image registration system 5 in order to provide support the receiver medium 10 so that the receiver medium 10 doesn't flutter within the field-of-view of the first imaging system 40 and the second imaging system 45. The first imaging system 40 and the second imaging system 45 are positioned such that the components of the media transport system 12 do not interfere with viewing the respective sides of the receiver medium 10.

To enable the imaging systems 40, 45 to provide meaningful data concerning the spatial relationship between the images printed on the first side 10A and the second side 10B of the receiver medium 10, the spatial relationship between the first imaging system 40 and the second imaging system 45, or more precisely the spatial relationship of their respective fields-of-views, must be determined. To this end, in accordance with a preferred embodiment of the present invention, an illumination system 48 is provided that illuminates the first side 10A (or alternatively the second side 10B) of the receiver medium 10 with projected light 55 that produces an illumination pattern 50 on the receiver medium 10.

A portion of the light in the illumination pattern 50 is reflected from the first side 10A of the receiver medium 10, thereby providing a reflected illumination pattern 52, and a portion of the light in the illumination pattern 50 is transmitted through the receiver medium 10 to the second side 10B, thereby providing a transmitted illumination pattern 54. The transmitted illumination pattern 54 and the reflected illumination pattern 52 are located directly opposite each other on the two sides of the receiver medium 10 so that the in-track and cross-track positions of the reflected illumination pattern 52 and the in-track and cross-track positions of the transmitted illumination pattern 54 substantially coincide with each other.

The first image of the illumination pattern 50 captured by the first imaging system 40 and the second image of the illumination pattern 50 captured by the second imaging system 45 can be captured at substantially the same time, or alternatively can be captured at different times. This represents a significant advantage over methods that involve capturing images of a physical mark on the receiver medium 10 in order to align a plurality of cameras. With such methods, if the receiver medium is not stationary, and if the images are not captured at the exact same moment, the physical mark will not be at the same physical location in both images. With the approach used in the present invention, the illumination pattern 50 will remain in the same physical location even if the media is in motion, and even if the images are captured at different times.

In some embodiments, if the images are captured at different times, the intensity at which the illumination system 48 projects the illumination pattern 50 onto the receiver medium 10 can be adjusted between the capture of the two images. This allows the illumination pattern 50 to be projected with a relatively high intensity when capturing the image of the transmitted illumination pattern 54 using the second imaging system 45 in order to provide acceptable contrast. The intensity of the illumination pattern 50 can be reduced when capturing the image of the reflected illumination pattern 52 using the first imaging system 40 so that the captured image isn't degraded by over-exposure. The illumination intensity can be adjusted in some embodiments by adjusting the power level supplied to the illumination system 48. In other embodiments, a filter can be inserted into the optical path of the illumination system 48 to attenuate the intensity of the projected illumination pattern 50.

Knowing that the positions of the reflected illumination pattern 52 and the transmitted illumination pattern 54 coincide with each other enables the spatial relationship of the first imaging system 40 and the second imaging system 45 to be determined. In particular, the relative in-track and cross-track positions, as well as any or rotation about the camera axes, of the first imaging system 40 relative to the second imaging system 45 can be determined. Furthermore, any image magnification differences can also be determined.

Figure 4:
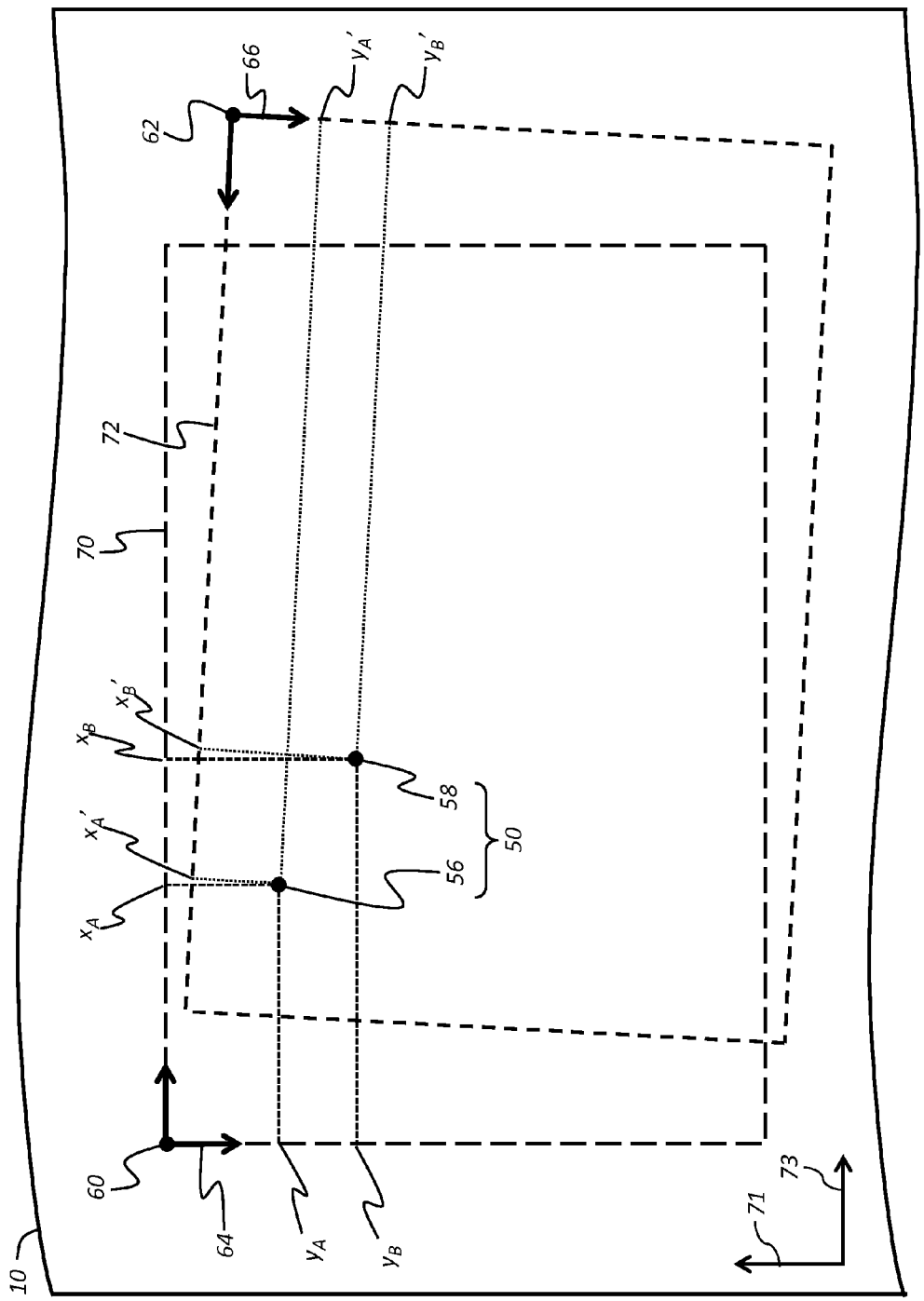
FIG. 4 illustrates a receiver medium having a projected illumination pattern overlaid with first and second image regions corresponding to the fields-of-view of first and second imaging systems.

FIG. 4 shows a portion of the receiver medium 10 on which an illumination pattern 50 is projected. In a preferred embodiment, the illumination pattern 50 includes one or more fiducials. The fiducials can include spots, reticules, lines, squares or other geometric patterns.

In some embodiments, it may only be necessary to determine the offset of the origins of the first imaging system 40 and the second imaging system 45. In this case, the illumination pattern 50 can comprise a single fiducial in the form of a single spot. In embodiments where it is necessary to determine a shift in the camera rotation or camera magnification between the first imaging system 40 and the second imaging system 45, then the illumination pattern 50 must include two or more illumination features spaced apart from each other. The two or more illumination features can comprise two or more spots, or two or more identifiable features of a more complex geometric shape such as the corners of a square fiducial or the center of a circular fiducial that have a defined spatial relationship to each other. In some embodiments, the illumination pattern 50 includes a plurality of illumination features distributed at different positions across a width of the receiver medium 10.

In the example of FIG. 4, the illumination pattern 50 includes a first feature 56 and a second feature 58, which have a defined spatial relationship to each other. In this case, the features are circular spots, although this is not limiting. (While the first feature 56 and the second feature 58 are shown as black circles in the figure, they will typically be bright spots on a darker background in an actual image.) The first imaging system 40 (FIG. 3) and the second imaging system 45 (FIG. 3) are positioned to capture images of illumination pattern 50. The first imaging system 40 captures the reflected illumination pattern 52 (FIG. 3) that is reflected from the first side 10A of the receiver medium 10 facing the illumination system 48, while the second imaging system 45 captures an image of the transmitted illumination pattern 54 (FIG. 3) that is transmitted through the receiver medium 10 to the opposite second side 10B.

The first imaging system 40 has a first field-of-view 42 (FIG. 3) that captures a first image region 70, and the second imaging system 45 has a second field-of-view 46 (FIG. 3) that captures a second image region 72. The first image region 70 and second image region 72 are typically not perfectly aligned with each other, but there is a region of overlap that includes the projected illumination pattern 50. The misalignment between the first image region 70 and the second image region 72 is typically the result of tolerances in the hardware that positions the first imaging system 40 and the second imaging system 45.

In FIG. 4, the second image region 72 is shown shifted in an in-track direction 71 and in a cross-track direction 73, and is also rotated around the camera axis (perpendicular to the plane of the receiver medium 10) relative to the first image region 70. The first image region 70 has a first coordinate system 64 with a first origin 60, and the second image region 72 has a second coordinate system 66 with a second origin 62. In this illustration, the second origin 62 is shown on the right side of the field-of-view while the first origin 60 is on the left as would be the case when the second imaging system 45 is on the opposite side of the receiver medium from the first imaging system 40. However, this convention is arbitrary since either of the images can be flipped or rotated to any convenient orientation, and the designation of the position of the origin is arbitrary.

The image registration controller 7 (FIG. 3) analyzes the images captured by the first imaging system 40 and the second imaging system 45 to determine the positions of the features of the illumination pattern 50 within the fields-of-view associated with each camera. In this example, the illumination pattern 50 has two features: first feature 56 and second feature 58. The first feature 56 has coordinates ($x_A$, $y_A$), and the second feature has a second coordinate ($x_B$, $y_B$) in the first image region 70. Similarly, the second feature 58 has coordinates ($x_A'$, $y_A'$), and the second feature has a second coordinate ($x_B'$, $y_B'$) in the second image region 72. The coordinates of the features can be determined by applying well-known image analysis methods to analyze the images captured by the first imaging system 40 and the second imaging system 45. For example, if the features are circular spots, the captured images can be thresholded and contiguous groups of pixels that fall above the threshold can be identified. The centroids of the groups of pixels can then be determined to determine the associated coordinates of the features.

Through analysis of the measured coordinates of the first feature 56 and the second feature 58 in the first coordinate system 64 and the second coordinate system 66, respectively, by the image registration controller 7, a coordinate transformation between the two coordinate systems can be determined which accounts for any in-track and cross-track position shifts between the first origin 60 and the second origin 62, and any rotation of the second coordinate system 66 relative to the first coordinate system 64, as well as any magnification differences. Coordinate transformations can be expressed using equations $$x' = ax + by + c$$
$$y' = bx - ay + d \quad (1)$$

where (x,y) are the coordinates of a point in the first coordinate system 64, (x',y') are the coordinates of the corresponding point in the second coordinate system 66, and a, b, c and d are constants. The values of the constants can be determined by inserting the measured x- and y-coordinates for the first feature 56 and second feature 58 into Eq. (1), which gives four equations with four unknowns (the constants a, b, c and d):

$$x_A' = ax_A + by_A + c$$
$$y_A' = bx_A - ay_A + d$$
$$x_B' = ax_B + by_B + c$$
$$y_B' = bx_B - ay_B + d \quad (2)$$

which can then be solved for the values of the four constants using standard methods well-known to those skilled in the art.

Once the coordinate transformation is determined, it can be subsequently used by the image registration controller 7 to transform position data determined from image data captured by one of the imaging systems into the coordinate system of the imaging system, or into a global coordinate system defined relative to the in-track and cross-track directions of the printing system. These determined coordinate transformations (or image system alignment parameters related to the determined coordinate transformations) such as origin offset values, coordinate system rotation angles and magnification values, can be stored in memory for subsequent use in registering the first-side and the second-side printed images.

During subsequent printing operations, documents can be printed having registration marks printed on the first side 10A and the second side 10B of the receiver medium 10. The first imaging system 40 and the second imaging system 45 can capture images of the receiver medium 10 which include the registration marks on the first side 10A and the second side 10B of the receiver medium 10. The image registration controller 7 can analyze the captured images to determine the position of the first side registration mark in the first coordinate system 64 associated the first imaging system 40 and the position of the second side registration mark in the second coordinate system 66 associated with the second imaging system 45. The determined coordinate transformation between the first coordinate system 64 and the second coordinate system 66 can be used to transform the captured images into a common coordinate system so that the relative positions of the registration marks on the printed images can be determined. Alternately, the position data of the registrations marks on the two sides of the receiver medium 10 can be determined in the original captured images, and the position data of the registration marks can be transformed into the common coordinate system.

Based on the determined relative positions of the first side and second side registration marks, the image registration controller 7 can then affect a shift in the position of at least one of the first and the second side images for subsequently printed documents to correct for any image registration errors. In some embodiments, the image registration controller 7 affects this image shifting by sending image plane shift parameters to the print controller 6, which then alters the print data to produce the desired shifting of one or more image planes. In other embodiments, the image registration controller sends image plane shift data to the printheads (first printhead 20 and second printhead 25), which produce the desired shifts as they receive the image data from the print controller 6.

The illumination system 48 in FIG. 3 is distinct from the light sources 44. The light sources 44 provide a broad pattern of approximately uniform lighting covering the field-of-view of the first imaging system 40 and the second imaging system 45 so that the captured images have sufficient brightness to accurately detect the patterns printed on the receiver medium 10. The illumination system 48 on the other hand projects a non-uniform illumination pattern 50 onto the receiver medium 10 so that the first imaging system 40 and the second imaging system 45 can capture images of the illumination pattern 50 itself. Typically the light sources 44 would not be energized at the same time as the illumination system 48. This is because the non-uniform illumination pattern 50 produced by the illumination system 48 would degrade the uniformity of lighting from the light sources 44 when capturing images of printed patterns on the receiver medium 10. Similarly, the uniform lighting pattern from the light sources 44 would degrade the contrast of the projected illumination pattern 50 on the receiver medium 10 when capturing images of the illumination pattern 50 during the camera alignment process.

Figure 5:
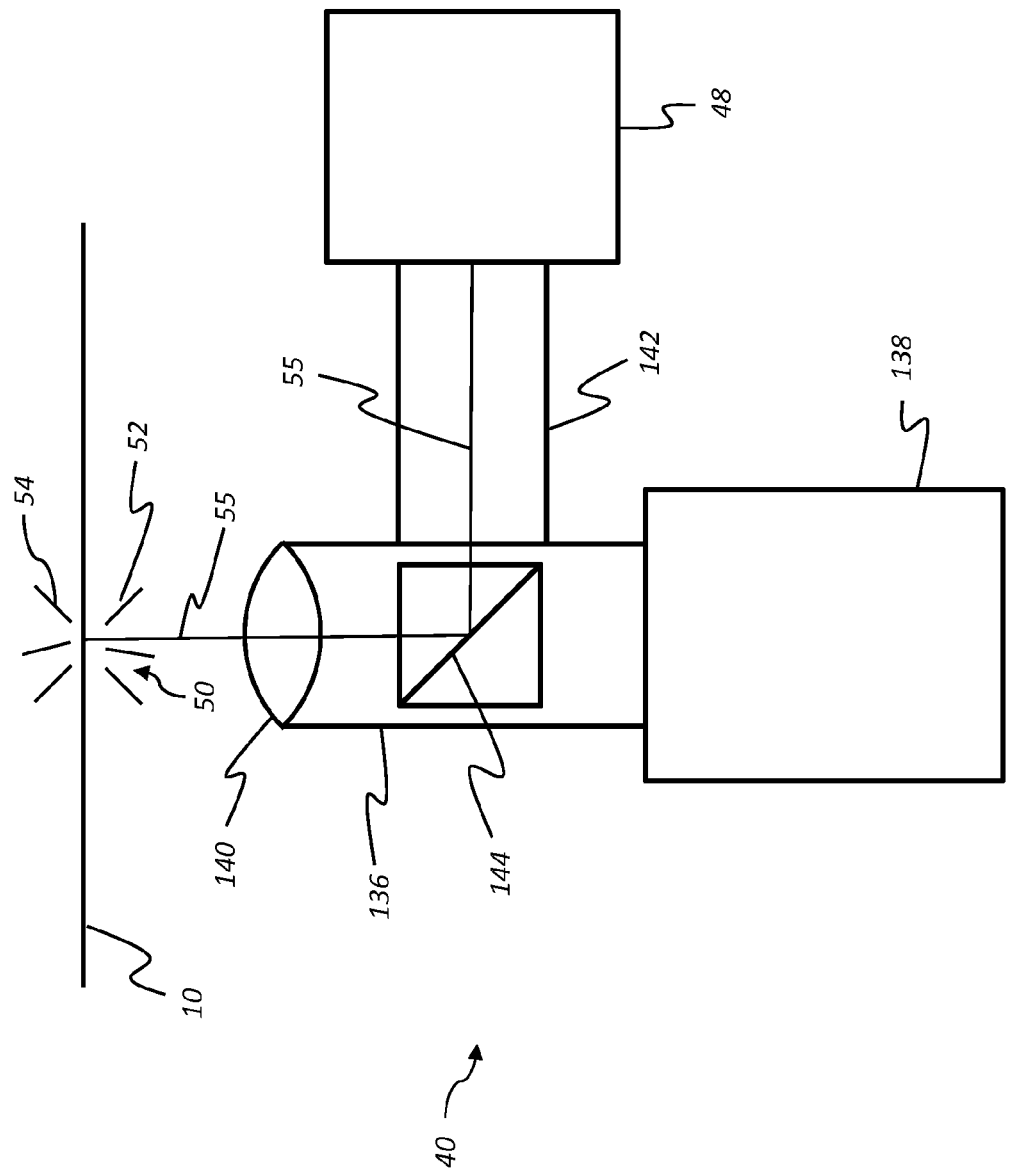
FIG. 5 is a schematic diagram illustrating an alternate embodiment of an image registration system where the illumination system is integrated with one of the imaging systems.

FIG. 3 shows the illumination system 48 positioned to the side to the first imaging system 40, with the projected light 55 being directed at an angle toward the receiver medium 10. In an alternate embodiment shown in FIG. 5, the first imaging system 40 includes a lens assembly 136 attached to an image capture device 138. The lens assembly 136 includes a side port 142 to which the illumination system 48 is attached. Projected light 55 from the illumination device for forming the illumination pattern 50 is directed through the side port 142, and is reflected by a beam splitter 144 through a lens 140 and onto the receiver medium 10. Light from the reflected illumination pattern 52 is captured by the lens 140 and directed through the beam splitter 144 where it is detected by the image capture device 138.

Figure 6:
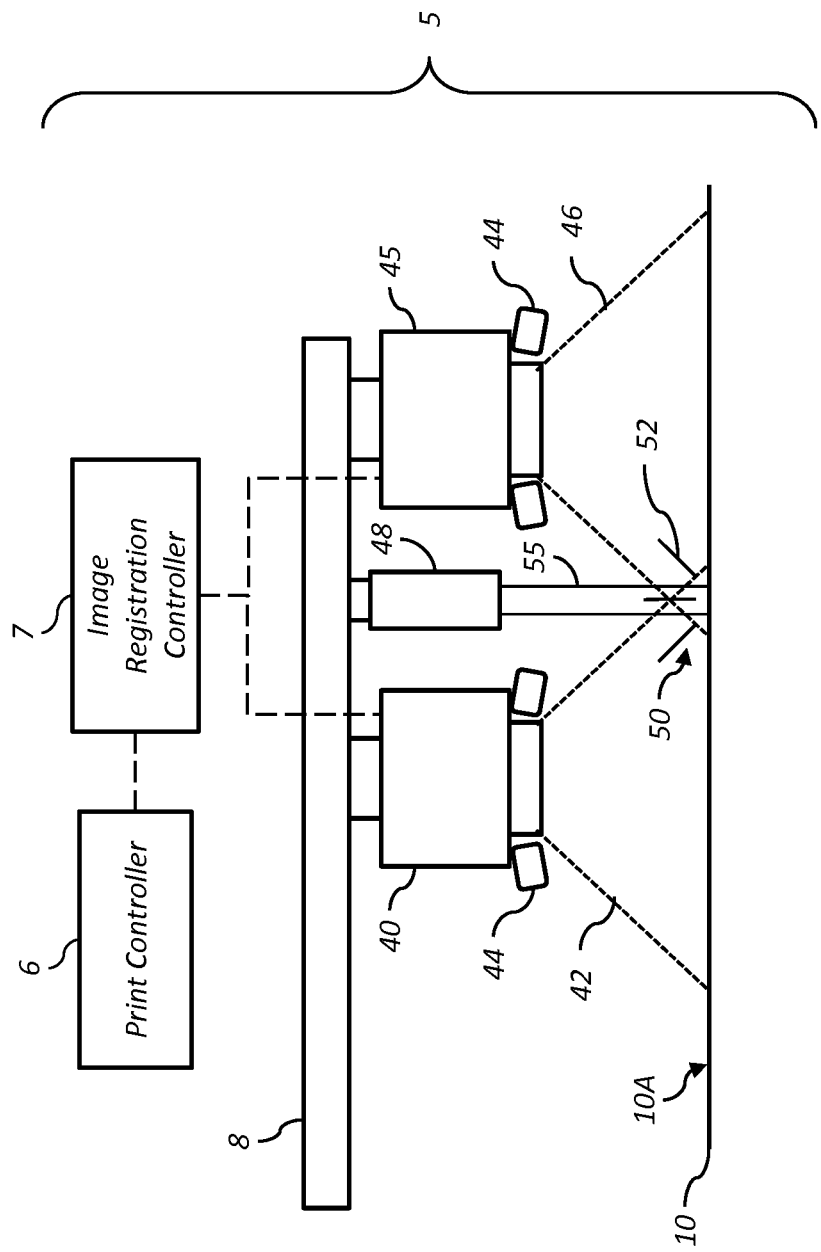
FIG. 6 is a schematic diagram illustrating an alternate embodiment of an image registration system where multiple imaging systems are positioned on the same side of the receiver medium.

FIG. 6 shows another embodiment of the invention in which the first imaging system 40 and the second imaging system 45 are both located on the same side of the receiver medium 10. In this example, they are both positioned to capture images of the first side 10A of the receiver medium. (For example, at a location in the digital printing system 3 (FIG. 2) between the first printhead 20 and the turnover mechanism 15.) This embodiment is appropriate for digital printing systems 3 in which the width of the receiver medium 10 exceeds the width of the field-of-view of the imaging system, so that two or more imaging systems are required to capture images across the full width of the receiver medium 10. The first field-of-view 42 of the first imaging system 40 partially overlaps the second field-of-view 46 of the second imaging system 45. The illumination system 48 projects projected light 55 onto the receiver medium 10 producing illumination pattern 50. The illumination pattern 50 falls within both the first field-of-view 42 of the first imaging system 40 and the second field-of-view 46 of the second imaging system 45. Images of the illumination pattern 50 on the receiver medium 10 are captured with the first imaging system 40 and the second imaging system 45. In a manner that is analogous to the method that was discussed relative to FIGS. 3-4, the captured images are analyzed by the image registration controller 7 to determine the location of the features of the illumination pattern 50 within the field-of-view of both the first imaging system 40 and the second imaging system 45. The image registration controller 7 then analyzes the location data for the features of the illumination pattern 50 to determine a coordinate transformation that can be used to align images captured by the first imaging system 40 and the second imaging system 45.

The embodiments described above have used two-dimensional (2D) imaging systems which use 2D image sensor arrays for capturing images of a 2D region on the receiver medium 10. The 2D imaging systems are used to capture 2D images of the illumination patterns 50 projected onto the receiver medium 10 by the illumination system 48, as well as images of the patterns printed on the receiver medium 10 by the first printhead 20 and the second printhead 25. When 2D imaging systems are used, the illumination pattern 50 can comprise one or more spots, or more complicated patterns that are in the fields-of-view of the first imaging system 40 and the second imaging system 45. (If it is only necessary to determine an offset between the origins of the two imaging system, the illumination pattern 50 can comprise a single feature such as a circular spot. If it is necessary to determine either a camera rotation or a camera magnification change between the two imaging systems, then two features are required as a minimum.)

The invention can also be employed where one or both of the imaging systems use a linear one-dimensional (1D) sensor array that captures an image of a linear image region on the receiver medium 10. With such imaging systems, 2D images can be captured by using the 1D sensor array to capture a time sequence of 1D image lines as the receiver medium 10 moves past the imaging system. The 1D image lines can then be assembled to form the 2D images. With imaging systems that use 1D sensor arrays, it cannot be assumed that the 1D sensor arrays are aligned with sufficient accuracy in the in-track direction (which corresponds to a single pixel wide field-of-view of the 1D sensor arrays) to enable point like image features to be in the fields-of-view of both the first imaging system 40 and the second imaging system 45. To overcome this problem requires that the features of the illumination pattern 50 be extended at least a short distance in the in-track direction to ensure that the illumination features intersect with the fields-of-view of the first imaging system 40 and the second imaging system 45.

Figure 7:
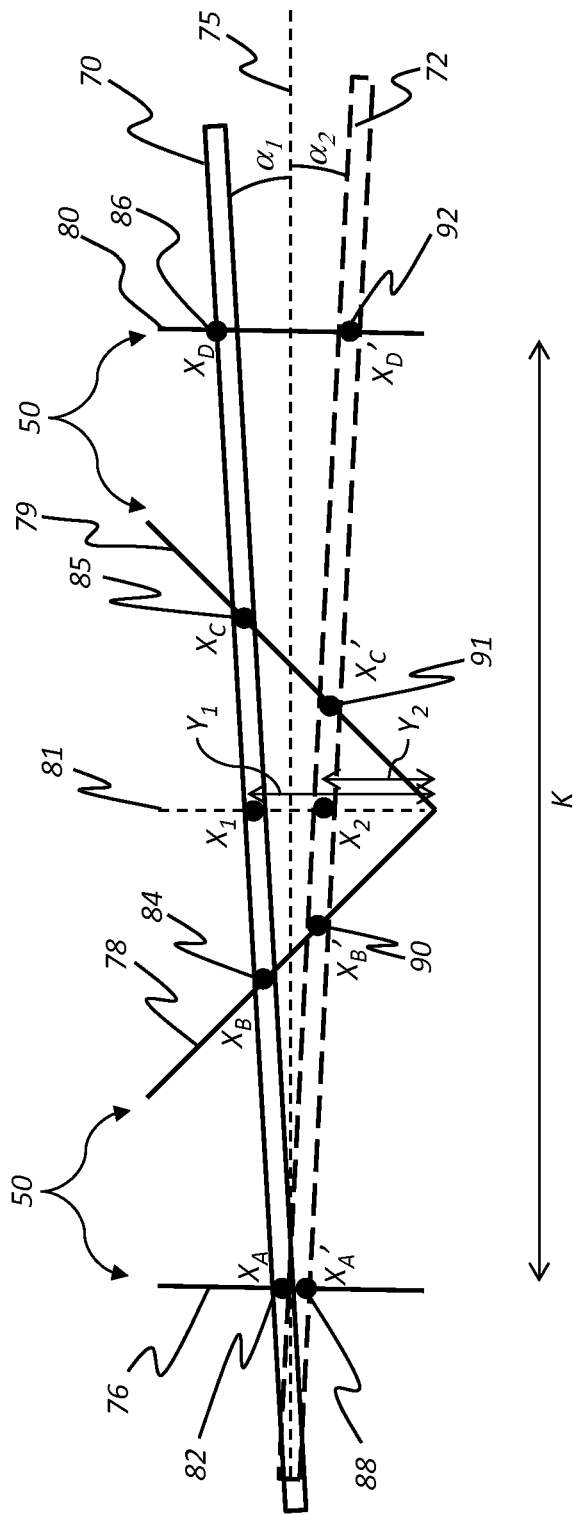
FIG. 7 illustrates an exemplary illumination pattern that includes a plurality of linear features which is appropriate for use with one-dimensional sensor arrays.

FIG. 7 shows an embodiment of an exemplary illumination pattern 50 that is appropriate for use in embodiments of the invention where the imaging systems use linear 1D sensor arrays. The illustrated illumination pattern 50 includes four linear features 76, 78, 79, 80, where the linear features 78 and 79 are not parallel to the linear features 76 and 80. It will be obvious to one skilled in the art that a wide variety of different illumination patterns 50 can be used in accordance with the present invention that will accomplish the desired purpose. Generally, at least some of the linear features should be arranged with different slant angles so that the position of the illumination pattern 50 can be determined responsive to distances between intersection points where the linear features cross the 1D image regions associated with the imaging systems 40, 45. For example, the illumination pattern 50 can include an "M-shaped" pattern where the linear features 76, 78, 79, 80 are joined, or it can include a "V-shaped" pattern, a "Z-shaped" pattern or a crossed-line pattern. In the most general case, the "linear features" need not be straight lines as long as they have a well-defined geometry. The analysis of the detected images however would be more complicated.

The first imaging system 40 has a field-of-view corresponding to the linear first image region 70, and the second imaging system 45 has a field of view corresponding to the linear second image region 72. The second image region 72 is shown as being offset in the in-track direction and the cross-track direction relative to the first image region 70. The second image region 72 is also rotated relative to the first image region 70. The first image region 70 is rotated at an angle of $\alpha_1$ relative to the cross-track direction, and the second image region 72 is rotated at an angle of $\alpha_2$ relative to the cross-track direction shown by axis 75. Each of the linear features 76, 78, 79, 80 intersects with both the first image region 70 and the second image region 72.

The four projected linear features 76, 78, 79, 80 intersect the first image region 70 at intersection points 82, 84, 85 and 86, with the coordinates of the intersection points along the length of the first image region 70 being $X_A$, $X_B$, $X_C$ and $X_D$, respectively. Likewise, the linear features 76, 78, 79, 80 intersect the second image region 72 at intersection points 88, 90, 91 and 92, with the coordinates of the intersection points along the length of the first image region 70 being $X_A'$, $X_B'$, $X_C'$ and $X_D'$, respectively. The image captured by the first imaging system 40 and the second imaging system 45 are analyzed by the image registration controller 7 to determine the locations of the intersection points 82, 84, 85, 86, 88, 90, 91, 92. Knowing the spacing and orientation of the projected linear features 76, 78, 79, 80 and the determined locations of the intersection points 82, 84, 85, 86, 88, 90, 91, 92, enables the image registration controller 7 to determine position and orientation of the first image region 70 and the second image region 72.

By way of example, in the arrangement of FIG. 7 the first linear feature 76 and the fourth linear feature 80 are parallel and vertical (i.e., the extend in the in-track direction), and they have a known spacing (K) relative to each other. The second linear feature 78 and the third linear feature 79 are tilted angles of 45° relative to the horizontal (i.e., the cross-track direction), and intersect at a midline 81 that is halfway between the first linear feature 76 and the fourth linear feature 80. Letting $D_{AB}=X_B-X_A$, $D_{BC}=X_C-X_B$, $D_{CD}=X_D-X_C$, $D_{AB}'=X_B'-X_A'$, $D_{BC}'=X_C'-X_B'$, $D_{CD}'X_D'-X_C'$, it can be shown using straight forward geometry and trigonometry that the rotation angles of the image regions are given by:

$$\alpha_1 = \text{Tan}^{-1}\left(\frac{D_{AB} - D_{CD}}{D_{BC}}\right) \quad (2)$$

$$\alpha_2 = \text{Tan}^{-1}\left(\frac{D_{AB'} - D_{CD'}}{D_{BC'}}\right)$$

where $\alpha_1$ is the rotation angle of the first imaging system 40, and $\alpha_2$ is the rotation angle of the second imaging system 45.

Likewise, it can be shown that the in-track positions of the image regions are given by:

$$Y_1 = D_{BC}\frac{\cos(2\alpha_1)}{2\cos(\alpha_2)} \quad (3)$$

$$Y_2 = D_{BC'}\frac{\cos(2\alpha_2)}{2\cos(\alpha_2)}$$

where $Y_1$ is the in-track position of the first imaging system 40 at the midline 81, and $Y_2$ is the in-track position of the second imaging system 45 at the midline 81. Similarly, it can be shown that the cross-track positions of the image regions are given by $$X_1=(X_D+X_A)/2$$

$$X_2=(X_D'+X_A')/2 \quad (4)$$

where $X_1$ is the cross-track coordinate for the first imaging system 40 at the midline 81 of the illumination pattern, and $X_2$ is the cross-track coordinate for the second imaging system 45 at the midline 81 of the illumination pattern.

It can also be shown that the magnifications of the two imaging systems are given by:

$$m_1=(X_D-X_A)\cos(\alpha_1)/K$$

$$m_2=(X_D'-X_A')\cos(\alpha_2)/K \quad (5)$$

where $m_1$ is the magnification of the first imaging system 40, and $m_2$ is the magnification of the second imaging system 45.

Once the positions, orientations and magnifications of the first image region 70 and the second image region 72 have been determined, a coordinate transformation between the coordinate systems of the images captured with the first imaging system 40 the second imaging system 45 can be determined. Once the coordinate transformation has been determined, it can be subsequently used by the image registration controller 7 to transform the position data determined from image data captured by one of the imaging systems into the coordinate system of the other imaging system, or into a global coordinate system defined relative to the in-track and cross-track directions of the printing system. These determined coordinate transformations (or image system alignment parameters related to the determined coordinate transformations) such as in-track and cross-track origin offset values, coordinate system rotation angles and magnification values, can be stored in memory for subsequent use in registering the first-side and the second-side printed images.

Figure 8:
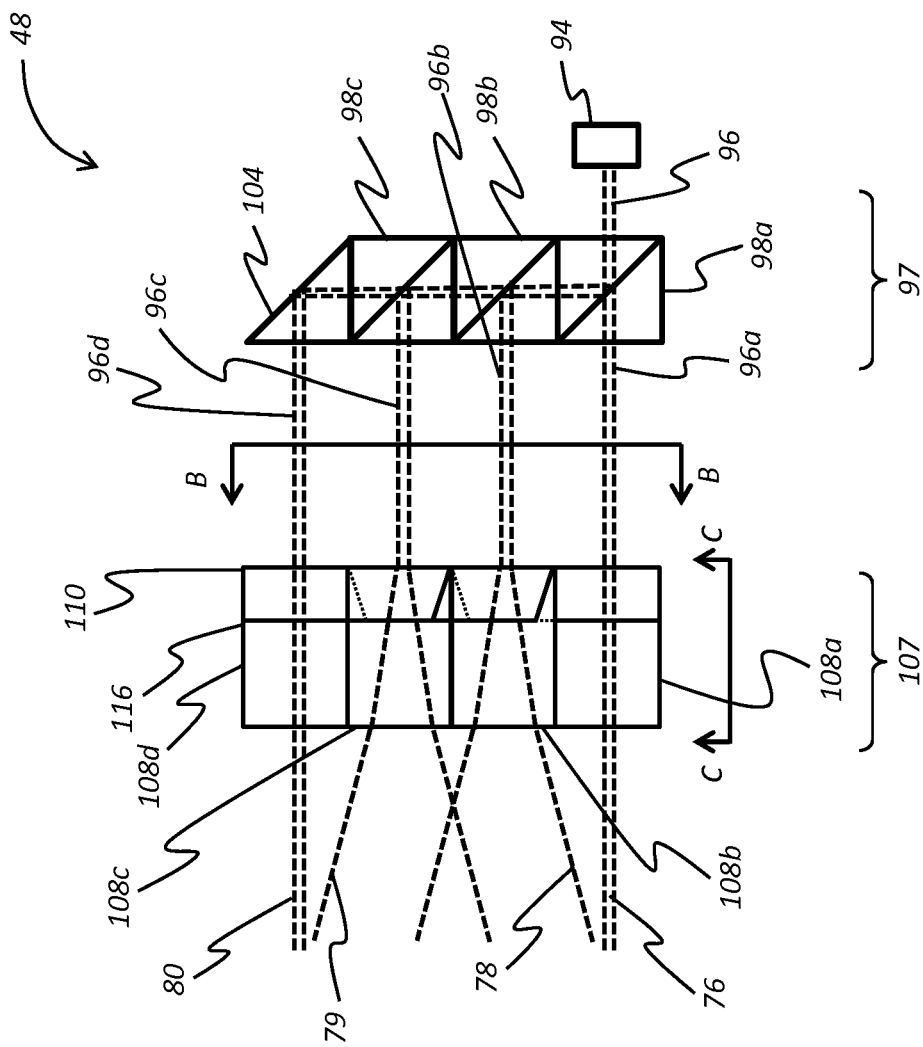
FIG. 8 illustrates an exemplary embodiment of an illumination source for producing the illumination pattern of FIG. 7.

FIG. 8 shows one embodiment of an illumination system 48 that can be used to form an illumination pattern 50 such as that illustrated in FIG. 7, which includes four linear features 76, 78, 79, 80. The illumination system 48 of FIG. 8 includes a laser 94, a beam splitter assembly 97, and a line generator assembly 107. The beam splitter assembly 97 includes a first beam splitter 98a, a second beam splitter 98b, a third beam splitter 98c, and a prism 104. The line generator assembly 107 includes four Powell lenses 108a, 108b, 108c and 108d.

A laser beam 96 from laser 94 is directed at the first beam splitter 98a of the beam splitter assembly 97. The first beam splitter 98a allows a portion of the light in the laser beam 96 to pass on toward the first Powell lens 108a of the line generator assembly 107 as first laser beam 96a. A second portion of the light is deflected by the first beam splitter 98a and is directed toward the second beam splitter 98b. The second beam splitter 98b splits out a second laser beam 96b, which is directed toward the second Powell lens 108b of the line generator assembly 107. A third portion of the light passes through the second beam splitter 98b is directed toward the third beam splitter 98c. The third beam splitter 98c splits out a third laser beam 96c, which is directed toward the third Powell lens 108c of the line generator assembly 107. A fourth portion 96d of the light passes through the third beam splitter 98c and is reflected by the prism 104 toward the fourth Powell lens 108d of the line generator assembly 107 as fourth laser beam 96d. The first laser beam 96, second laser beam 96b, third laser beam 96c and fourth laser beam 96d are parallel to each other, and the spacing of the four laser beams is defined by the geometry of the beam splitter assembly 97.

The line generator assembly 107 includes four Powell lenses 108a, 108b, 108c, 108d. This is further illustrated in FIG. 9, which shows a view of the line generator assembly 107 as viewed along line B-B in FIG. 8. Powell lenses are well-known in the art and are commercially available from various suppliers. Such lenses produce a diverging fan of light with quite uniform illumination when a laser beam is directed at a ridgeline of the lens. In this case, Powell lens 108a has a ridgeline 112a that forms the first linear feature 76, Powell lens 108b has a ridgeline 112b that forms the second linear feature 78, and Powell lens 108c has a ridgeline 112c that forms the third linear feature 80.

The ridgeline 112a of Powell lens 108 is parallel with and in line with the ridgeline 112d of Powell lens 108d. The diverging fan of light from the first Powell lens 108a that forms linear feature 76 (which is perpendicular to the ridgeline 112a) is therefore parallel to the diverging fan of light from the fourth Powell lens 108d that forms linear feature 80 (which is perpendicular to the ridgeline 112d). The second Powell lens 108b is rotated so that its ridgeline 112b is not parallel to the ridgelines 112a, 112d of the other two Powell lenses 108a, 108d. In this example, it is rotated by 45 degrees so that the fan of diverging light and the resulting linear feature 78 are rotated by 45 degrees relative to those produced by the first and the fourth Powell lenses 108a, 108d. Likewise, the third Powell lens 108c is rotated so that its ridgeline 112c is not parallel to any of the other Powell lenses 108a, 108b, 108d. In this example, it is rotated by −45 degrees relative first and the fourth Powell lenses 108a, 108d, and is rotated 90 degrees relative to the second Powell lens 108b. The fan of diverging light and the resulting linear feature 79 are rotated by −45 degrees relative to those produced by the first and the fourth Powell lenses 108*a*, 108*d*.

FIG. 10 illustrates a cross-section of Powell lens 108*a* as viewed along line C-C in FIG. 8). The front surface of the Powell lens 108*a* (facing laser beam 96*a*) has an apex 110 (which forms the corresponding ridgeline 112*a* shown in FIG. 9), and tapers down to shoulder 116. When laser beam 96*a* is directed at the apex 110, a diverging light line 118 is formed, which produces the corresponding linear feature 76 in the illumination pattern 50 (FIG. 7).

Figure 11:
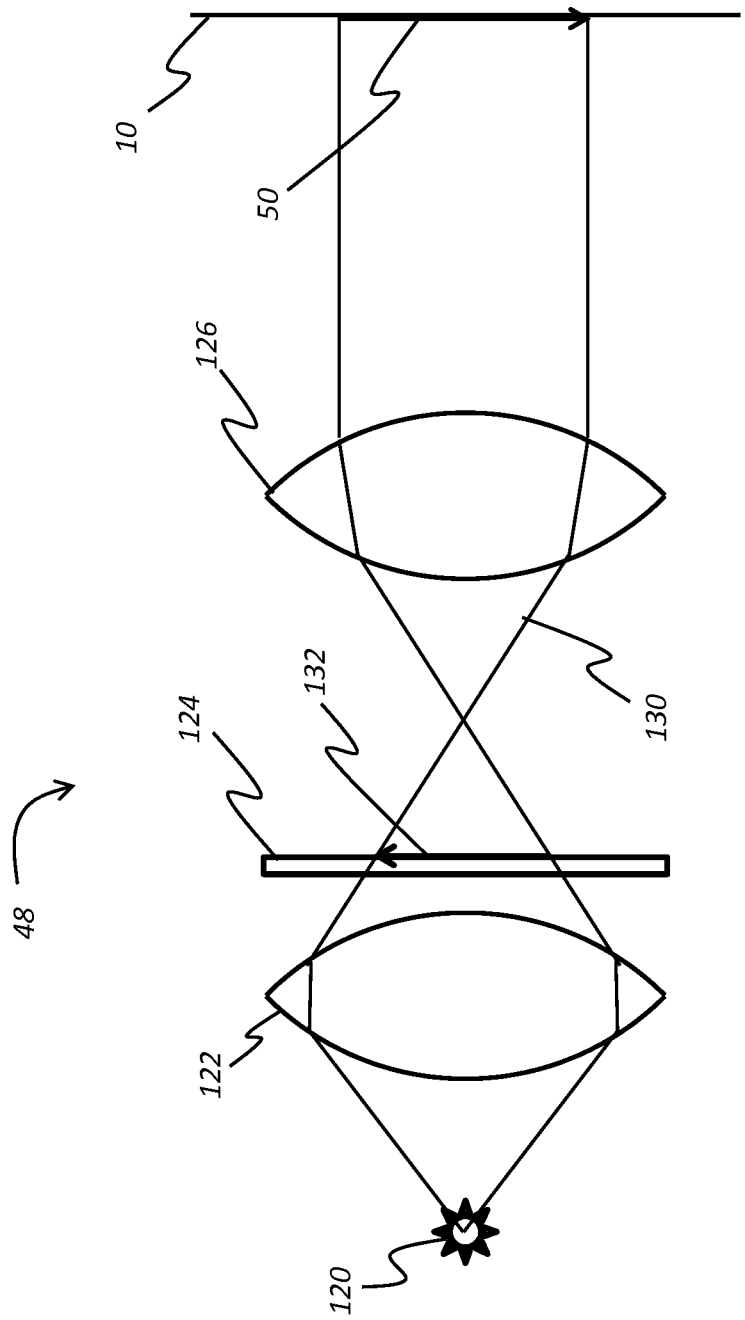
FIG. 11 illustrates another exemplary embodiment of an illumination source that uses a projection lens to project the illumination pattern onto the receiver medium.

FIG. 11 illustrates another embodiment of an illumination system 48. This embodiment uses a traditional projection system in which light from a light source 120 passes through a condenser lens 122 and is incident on a projection mask 124, which includes a projection pattern 132. A projection lens 126 focuses the light rays 130 passing through the projection mask 124 to form an image of the projection pattern 132 on the receiver medium 10, thereby producing the projected illumination pattern 50. This approach can be used to form complex illumination patterns 50 including a plurality of fiducials and other features. In some embodiments, the projection mask 124 can be removed or replaced with an alternative mask to enable the illumination system 48 to provide a uniform lighting profile. Such embodiments enable the illumination system 48 to also serve as one of the light sources 44 (FIG. 3).

Figure 12:
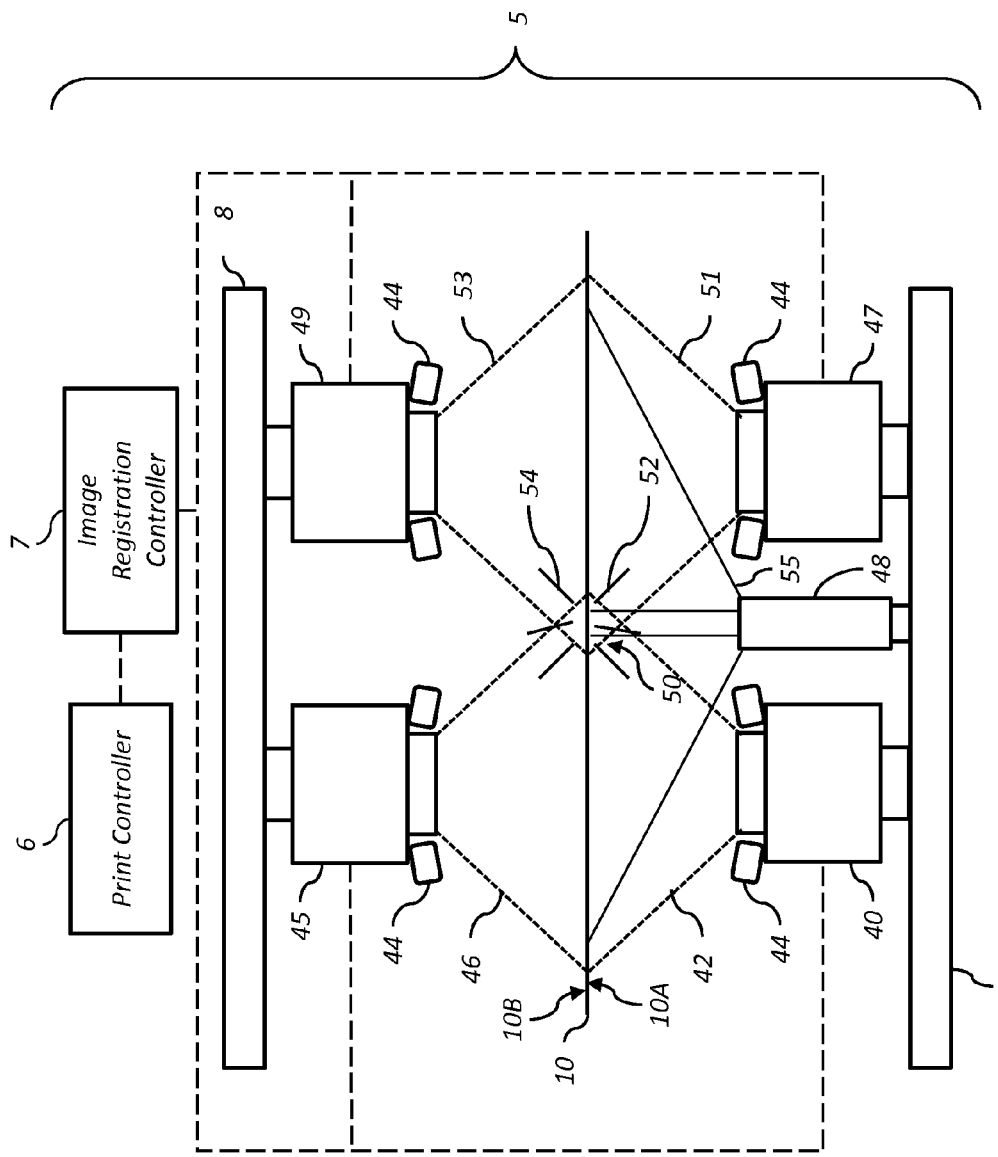
FIG. 12 is a schematic diagram illustrating an alternate embodiment of the image registration system where multiple imaging systems are positioned on both side of the receiver medium.

FIG. 12 shows another embodiment of the invention in which multiple cameras are used to capture images across the width of both the front and back sides of the receiver medium 10. The exemplary system includes first imaging system 40 having first field-of-view 42, second imaging system 45 having second field-of-view 46, third imaging system 47 having third field-of-view 51, and fourth imaging system 49 having fourth field-of-view 53. The first imaging system 40 and the third imaging system 47 are positioned to capture images of the first side 10A of the receiver medium 10, and the second imaging system 45 and the fourth imaging system 49 are positioned to capture images of the second side 10B of the receiver medium 10.

Illumination system 48 illuminates the first side 10A (or alternatively the second side 10B) of the receiver medium 10 with projected light 55 that produces an illumination pattern 50 on the receiver medium 10. In a preferred embodiment, the illumination pattern 50 is comprised of one or more illumination features such as fiducials. (Fiducials can include spots, reticules, lines, squares or other geometric patterns.) The illumination features in the illumination pattern have known spatial relationships to each other. In some embodiments, all of the illumination features in the illumination pattern 50 are formed in the overlap region of the fields-of-view 42, 46, 51, 53 of the imaging systems 40, 45, 47, 49. In other embodiments, the illumination pattern 50 can include illumination features that are distributed across the width of the receiver medium 10.

A portion of the light in the illumination pattern 50 is reflected from the first side 10A of the receiver medium 10 thereby providing a reflected illumination pattern 52, and a portion of the light in the illumination pattern 50 is transmitted through the receiver medium 10 to the second side 10B thereby providing a transmitted illumination pattern 54. At least a portion of the reflected illumination pattern 52 lies within the first field-of-view 42 of the first imaging system 40; at least a portion of the transmitted illumination pattern 54 lies within the second field-of-view 46 of the second imaging system 45; at least a portion of the reflected illumination pattern 52 lies within the third field-of-view 51 of the third imaging system 47; and at least a portion of the transmitted illumination pattern 54 lies within the fourth field-of-view 53 of the fourth imaging system 49.

At least some of the illumination features that are included in each of the fields-of-view 42, 46, 51, 53 have a known spatial relationships to each other, thereby enabling the images captured by the respective imaging systems 40, 45, 47, 49 to be aligned to each other. In a preferred embodiment, at least some of the illumination features in the illumination pattern 50 are detectable by both the first imaging system 40 and the second imaging system 45; and at least some of the illumination features in the illumination pattern 50 are detectable by both the third imaging system 47 and the fourth imaging system 49. In some embodiments, the spatial relationship between the illumination features that are detectable by the first imaging system 40 have a defined in-track offset and a defined cross-track offset relative to illumination features that are detectable by the third imaging system 47. In some embodiments, the defined spatial relationship between the features that are detectable by the first imaging system 40 and the features that are detectable by the third imaging system 47 are that the same illumination features are common to both the first field-of-view 42 and the third field-of-view 51. Portions of the reflected illumination pattern 52 are captured in images acquired by first imaging system 40 and the third imaging system 47, and portions of the transmitted illumination pattern 54 are captured in images acquired by the second imaging system 45 and the fourth imaging system 49.

Figure 13:
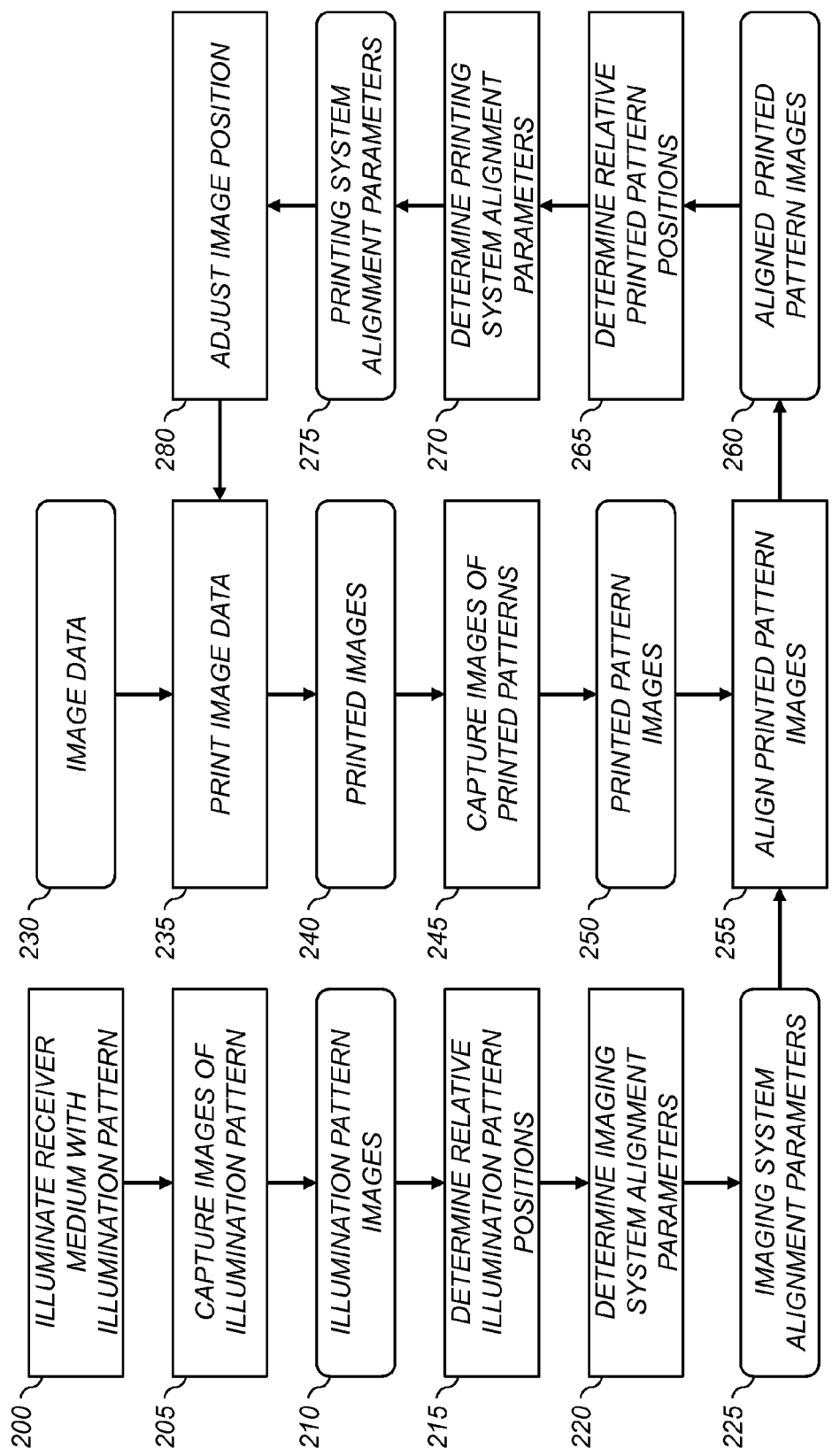
FIG. 13 is a flow chart of a method for aligning printed images in accordance with embodiments of the present invention.

In accordance with embodiments of the present invention such as those illustrated in FIGS. 3, 6 and 12, the method shown in FIG. 13 can be applied to align images captured with a plurality of imaging systems. While the method will be described with respect to the configuration shown in FIG. 12, it will be obvious to one skilled in the art that it is easily generalized to the other configurations as well. The method of FIG. 13 is implemented using a data processing system, such as the image registration controller 7 (FIG. 12), in response to a program of stored instructions stored in a program memory. The phrase "data processing system" is intended to include any data processing device, such as a central processing unit ("CPU"), a desktop computer, a laptop computer, a mainframe computer, or any other device for processing data, managing data, or handling data, whether implemented with electrical, magnetic, optical, biological components, or otherwise.

In illuminate receiver medium with illumination pattern step 200, the data processing system causes the illumination system 48 (FIG. 12) to illuminate the receiver medium 10 (FIG. 12) with an illumination pattern 50 (FIG. 12). In capture images of illumination pattern step 205, a plurality of imaging systems (e.g., first imaging system 40, second imaging system 45, third imaging system 47 and fourth imaging system 49) are caused to capture images of the receiver medium 10, thereby providing a corresponding set of illumination pattern images 210. Each of the captured illumination pattern images 210 includes at least a portion of the illumination pattern 50. Some of the imaging systems (e.g., first imaging system 40 and third imaging system 47) can capture images of the reflected illumination pattern 52, while other imaging systems (e.g., second imaging system 45 and fourth imaging system 49) can capture images of the transmitted illumination pattern 54.

The acquired illumination pattern images 210 are automatically analyzed using a determine relative illumination pattern positions step 215 to determine the relative illumination pattern positions. This generally involves determining locations of one or more features in the portion of the illumination pattern 50 contained within each of the illumination pattern images 210.

A determine imaging system alignment parameters step 220 is then used to determine a set of imaging system alignment parameters 225, that can be used to align images captured by the plurality of imaging systems. As discussed earlier, in a preferred embodiment the imaging system alignment parameters 225 associated with a particular imaging system can be parameters of a coordinate transformation that can be used to transform the associated captured images into a reference coordinate system. The reference coordinate system can be the coordinate system associated with one of the imaging systems, or it can be any other convenient coordinate system. In some embodiments, the imaging system alignment parameters 225 can be represented in other forms. For example, the imaging system alignment parameters 225 can include an in-track offset parameter, a cross-track offset parameter, a skew angle offset parameter, or a magnification adjustment parameter The imaging system alignment parameters 225 are stored in a processor-accessible memory for subsequent use in aligning images captured with each of the imaging systems. The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

A print image data step 235 is then used to cause the digital printing system 3 (FIG. 2) to print image data 230 on the receiver medium 10, thereby producing printed images 240. In some embodiments, the digital printing system 3 can print image data on both sides of the receiver medium 10. In some embodiments, the image data 230 can include alignment marks such as fiducials that can be used to conveniently assess the position of the printed images 240 on the receiver medium 10.

A capture images of printed patterns step 245 is then used to cause the imaging systems (e.g., first imaging system 40, second imaging system 45, third imaging system 47 and fourth imaging system 49) to capture images of the printed images 240, thereby providing printed pattern images 250.

An align printed pattern images step 255 is then applied to determine corresponding aligned printed pattern images 260 using the imaging system alignment parameters 225. As described earlier, this can be done by applying a coordinate transformation (determined in the determine imaging system alignment parameters step 220) for the associated imaging systems used to the printed pattern images 250.

There are many different reasons that it may be useful to determine the aligned printed pattern images 260. In an exemplary embodiment, the aligned printed pattern images 260 are used in the process of performing an alignment process for the digital printing system 3. For example, the image content printed on the first side 10A of the receiver medium 10 can be aligned with the image content printed on the second side 10B of the receiver medium 10, or the image content can be aligned to correct for other sources of misalignment such as skew of the first and second printheads 20, 25. The misalignments can result from mechanical tolerances, or from other sources such as expansion or shrinkage of the receiver medium 10 during the printing process.

A determine relative printed pattern positions step 265 is used to automatically analyze the aligned printed pattern images 260 to determine corresponding relative printed pattern positions. For cases where image content is printed on both sides of the receiver medium 10, this can include determining the relative positions of the printed patterns in the first-side printed image and the printed patterns in the second-side printed image.

A determine printing system alignment parameters step 270 is then used to determine printing system alignment parameters 275 that are appropriate to correct for any alignment errors that are detected in the relative printed pattern positions. The printing system alignment parameters can be used to align the printed patterns printed on different portions of the receiver medium 10 to each other (e.g., the printed patterns on the first side 10A can be aligned with the second side 10B or the printed patterns in one color channel can be aligned with the printed patterns in a different color channel). Alternately, the printing system alignment parameters can be used to align the printed patterns with aim positions (e.g., to correct for media size variations, printhead skew). The printing system alignment parameters 275 can include a variety of different parameters such as an in-track offset parameter, a cross-track offset parameter, a skew angle offset parameter, or a magnification adjustment parameter. The printing system alignment parameters 275 will generally be stored in a processor-accessible memory for subsequent use in aligning future printed images.

An adjust image position step 280 is then used to adjust the position of subsequent images printed by the print image data step 235 responsive to the determined printing system alignment parameters. For example, the position of the image data 230 printed on the second side 1 OB of the receiver medium 10 can be adjusted so that it is properly aligned with the image data 230 printed on the first side 10A of the receiver medium 10. In some cases, the image position can be adjusted by adjusting the time that the image data 230 is printed (e.g., by adjusting a cue delay), or by adjusting which nozzles are used to print the image data 230 (e.g., to shift the image in the cross-track direction). In other cases, the image position can be adjusted by manipulating the image data 230 being printed (e.g., by introducing a skew offset or applying a magnification factor).

In some cases, the process of determining the printing system alignment parameters 275 can be performed during an initial printer setup process, or during maintenance cycles. In other cases, it can be performed while the digital printing system 3 is being operated to provide real-time alignment correction.

For digital printing systems 3 in which the imaging systems (e.g., first imaging system 40, second imaging system 45, third imaging system 47 and fourth imaging system 49) are mounted at fixed locations relative to the media path of the receiver medium 10, the spatial relationships between the imaging systems tend to remain fixed. Therefore there is little need to periodically carry out the process of determining the imaging system alignment parameters 225. Typically this alignment process is carried out once when the digital printing system 3 with the image registration system 5 with the plurality of imaging systems is assembled and installed. In such systems, there may not be a need to incorporate the illumination system 48 as a permanent component of the printing system.

In some embodiments, it may be desirable to perform the process of aligning the imaging systems at infrequent intervals. In such cases, the illumination system 48 can be incorporated into a removable illumination module 148, such as that shown in FIG. 14. The removable illumination module 148 can then be installed in the digital printing system 3 when the alignment process is to be carried out to determine the alignment of the two or more imaging systems. At other times, the removable illumination module 148 can be removed from the digital printing system 3.

Figure 14:
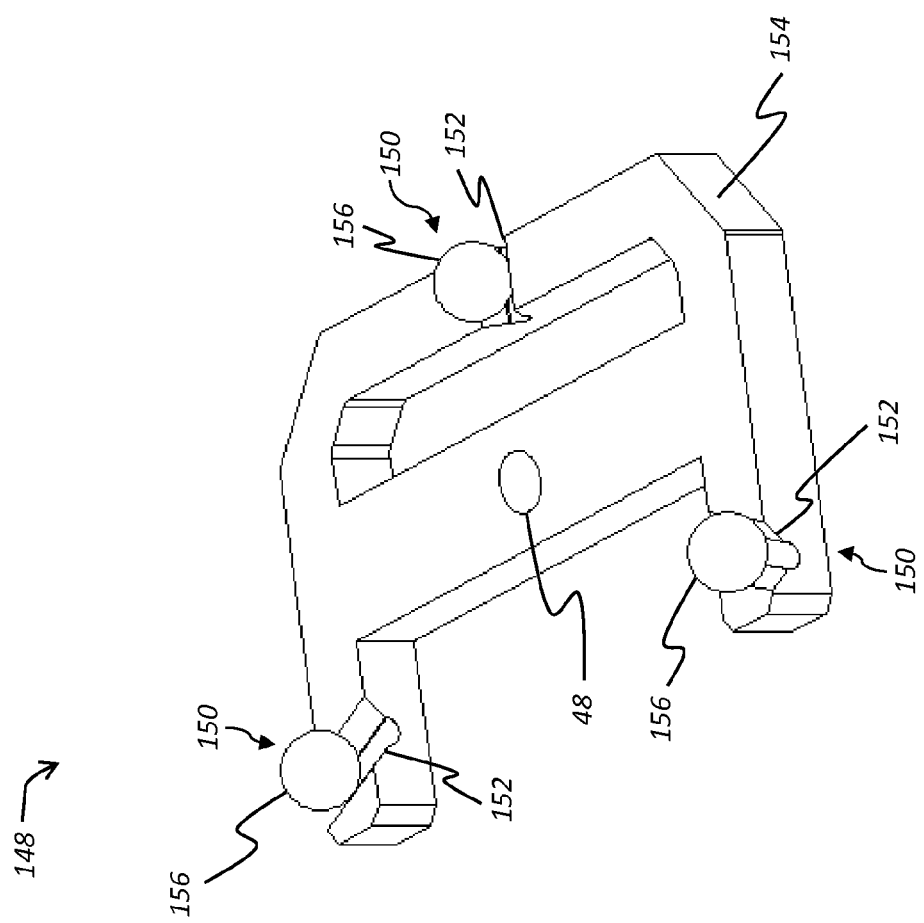
FIG. 14 illustrates a removable illumination module including kinematic alignment elements.

In some embodiments, the removable illumination module 148 includes alignment features which can engage alignment features on a frame or other fixed structure of the digital printing system 3 to enable the removable illumination module 148 to be installed in a reproducible manner. In some embodiments, the alignment features comprise kinematic alignment elements, such as those of a "2-2-2 mount or a "three groove mount" as shown in FIG. 14. The removable illumination module 148 is made up of a coupling member 154 in which is secured the illumination system 48. In FIG. 14, the removable illumination module 148 is in an inverted position to show a set of three locating structures 150. Each of the locating structures 150 includes a V-groove 152 that is provided in the coupling member 154, together with a corresponding locating element 156. Each of the V-grooves 152 includes a plurality of surfaces adapted to form contact with its corresponding locating elements 156. As shown, each of the V-grooves 152 extend along a direction that intersects a substantially common point located approximately at the illumination system 48. The corresponding set of locating elements 156 is positioned such that a locating element 156 is in contact with each respective one of the V-grooves 152. In this example embodiment, each of the locating elements 156 includes a sphere. Alternatively the locating elements 156 can include hemispheres having a hemispherical surface and a flat surface. When the spacing of the three locating elements 156 is fixed by some structure in the printing system (which has been hidden in FIG. 13 to better show the engagement of the various elements), the three V-grooves 152 can engage the three locating elements 156 (i.e. each V-groove 152 contacting a spherical or hemispherical surface of the corresponding locating element 156 at two points) in only one position constraining all six degree of freedom of the coupling member 154. Typically the three locating elements 156 are secured in pockets formed in mounting structure of the digital printing system 3. When the removable illumination module 148 is separated from the locating elements 156, the removable illumination module 148 can be returned to the original position with high placement precision by again engaging the locating structures 150. In an alternate embodiment, the three V-grooves 152 could be formed in the mounting structure of the digital printing system 3 and the three locating elements 156 could be secured to the coupling member 154 of the removable illumination module 148.

While the 2-2-2 mount is used in the exemplary embodiment of FIG. 14, other well-known kinematic mount configurations, such as a "3-2-1 mount," can be employed in other embodiments of the invention. In a 3-2-1 mount, also known as a "cone, groove and flat" mount, one part of the kinematic mount would include the three spherical or hemi-spherically shaped locating elements and a second part of the kinematic mount would include a cone-shaped locating element which constrains three degrees of freedom, a V-groove shaped locating element that constrains two degrees of freedom, and a flat shaped locating element that constrains one degree of freedom. In this way, all six degrees of freedom of the illumination module can be defined to ensure reproducible alignment of the illumination module to the supporting structure of the printing system.

In some embodiments, the entire image registration system 5 (FIG. 2) including the imaging systems 40, 45 and the illumination system 48 can be provided as a removable module that can be selectively installed into the digital printing system 3 (FIG. 2). For example, the image registration system 5 can be installed during periodic maintenance cycles to perform an alignment process. In this case, the image registration system 5 is preferably mounted in a frame structure which is provided with kinematic alignment elements that can be used to position it in a repeatable location.

The illumination systems 48 described in the illustrated embodiments are provided as examples only. It is anticipated that various other types of illumination systems 48 can alternatively be used, including the holographic projection means, multiple lasers, and various non-laser projection means. The illumination pattern 50 need not be restricted to illuminated features against a non-illuminated background. The illumination pattern 50 can also comprise non-illuminated features against an illuminated background.

Typically, the imaging systems will be sensitive to the visible portion of the electromagnetic spectrum. Therefore the illumination system 48 will generally be adapted to emit light in the visible spectrum. However, in some embodiments the illumination system 48 can emit "light" outside the visible spectrum (e.g., infrared or ultraviolet radiation) if the imaging systems are sensitive to detect the corresponding radiation. If the receiver medium 10 includes fluorescent dyes or pigments, the illumination system 48 can emit light at a wavelength which is not detected by the imaging systems but which excites the fluorescent material of the receiver medium 10, causing it to emit light at a different wavelength that can be detected by the imaging systems.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 1 printing system
3 digital printing system
5 image registration system
6 print controller
7 image registration controller
8 structural component
9 cue sensor
9b cue sensor
10 receiver medium
10A first side
10B second side
12 media transport system
13 encoder
15 turnover mechanism
20 first printhead
25 second printhead
30 first pattern
30A inverted first pattern
32 cue mark
32A inverted cue mark
35 second pattern
40 first imaging system
42 first field-of-view 44 light source
45 second imaging system
46 second field-of-view
47 third imaging system
48 illumination system
49 fourth imaging system
50 illumination pattern
51 third field-of-view
52 reflected illumination pattern
53 fourth field-of-view
54 transmitted illumination pattern
55 projected light
56 first feature
58 second feature
60 first origin
62 second origin
64 first coordinate system
66 second coordinate system
70 first image region
71 in-track direction
72 second image region
73 cross-track direction
75 axis
76 linear feature
78 linear feature
79 linear feature
80 linear feature
81 midline
82 intersection point
84 intersection point
85 intersection point
86 intersection point
88 intersection point
90 intersection point
91 intersection point
92 intersection point
94 laser
96 laser beam
96a first laser beam
96b second laser beam
96c third laser beam
96d fourth laser beam
97 beam splitter assembly
98a first beam splitter
98b second beam splitter
98c third beam splitter
104 prism
107 line generator assembly
108a first Powell lens
108b second Powell lens
108c third Powell lens
108c fourth Powell lens
110 apex
112a ridgeline
112b ridgeline
112c ridgeline
112d ridgeline
116 shoulder
118 diverging light line
120 light source
122 condenser lens
124 projection mask
126 projection lens
130 light rays
132 projection pattern
136 lens assembly
138 image capture device
140 lens
142 side port
144 beam splitter
148 removable illumination module
150 locating structure
152 V-groove
154 coupling member
156 locating element
200 illuminate receiver medium with illumination pattern step
205 capture images of illumination pattern step
210 illumination pattern images
215 determine relative illumination pattern positions step
220 determine imaging system alignment parameters step
225 imaging system alignment parameters
230 image data
235 print image data step
240 printed images
245 capture images of printed patterns step
250 printed pattern images
255 align printed pattern images step
260 aligned printed pattern images
265 determine relative printed pattern positions step
270 determine printing system alignment parameters step
275 printing system alignment parameters
280 adjust image position step

The invention claimed is:

1. An imaging module including a plurality of imaging systems for capturing images of a receiver medium, comprising:

an illumination system for illuminating the receiver medium with light providing an illumination pattern;

a first imaging system positioned to capture an image of at least a portion of the receiver medium, the first imaging system having a field-of-view that includes at least a portion of the illumination pattern;

a second imaging system positioned to capture an image of at least a portion of the receiver medium, the second imaging system having a field-of-view that includes at least a portion of the illumination pattern;

a data processing system; and a program memory communicatively connected to the data processing system and storing instructions configured to cause the data processing system to implement a method for aligning the first and second imaging systems, wherein the method includes:

using the first imaging system to capture a first image of the receiver medium, the first image including at least a portion of the illumination pattern;

using the second imaging system to capture a second image of the receiver medium, the second image including at least a portion of the illumination pattern;

analyzing the captured first and second images to determine a relative position of the illumination pattern in the first and second images;

determining one or more imaging system alignment parameters responsive to the determined relative position; and storing the determined imaging system alignment parameters in a processor-accessible memory for subsequent use in aligning images captured with the first imaging system with images captured with the second imaging system.

2. The imaging module of claim 1 wherein the receiver medium has a first side and an opposing second side, and wherein first and second imaging systems are positioned to capture images of the same side of the receiver medium.

3. The imaging module of claim 1 wherein the receiver medium has a first side and an opposing second side, the illumination system being positioned to illuminate the first side of the receiver medium such that a portion of the light in the illumination pattern is reflected from the first side of the receiver medium thereby providing a reflected illumination pattern and a portion of the light in the illumination pattern is transmitted through the receiver medium to the second side of the receiver medium thereby providing a transmitted illumination pattern, and wherein the first imaging system is positioned to capture an image of the first side of the receiver medium that includes at least some of the reflected illumination pattern and the second imaging system is positioned to capture an image of the second side of the receiver medium that includes at least some of the transmitted illumination pattern.

4. The imaging module of claim 1 wherein the imaging system alignment parameters include an in-track offset parameter, a cross-track offset parameter, a skew angle offset parameter, or a magnification adjustment parameter.

5. The imaging module of claim 1 wherein the imaging system alignment parameters include parameters for a coordinate transformation that transforms the coordinates of images captured with the first imaging system or the second imaging system to a reference coordinate system.

6. The imaging module of claim 5 wherein the reference coordinate system is a coordinate system associated with the first imaging system or the second imaging system.

7. The imaging module of claim 1 wherein the second image is captured at substantially the same time as the first image.

8. The imaging module of claim 1 wherein the second image is captured at a different time than the first image.

9. The imaging module of claim 8 wherein an amount of light provided by the illumination system is adjusted between the time that the first image is captured and the time that the second image is captured.

10. The imaging module of claim 1 wherein the illumination system is a removable module that can be installed in the imaging module while it performs the method of aligning the first and second imaging systems and can be removed from the imaging module at other times.

11. The imaging module of claim 1 wherein the illumination system includes a laser light source.

12. The imaging module of claim 1 wherein the illumination system includes a projection lens that projects the illumination pattern onto the receiver medium.

13. The imaging module of claim 1 wherein the illumination pattern includes a plurality of illumination features located at different positions across a width of the receiver medium.

14. The imaging module of claim 1 wherein at least one of the imaging systems includes a two-dimensional sensor array that captures an image of a two-dimensional region on the receiver medium.

15. The imaging module of claim 14 wherein the illumination pattern includes one or more fiducials.

16. The imaging module of claim 1 wherein at least one of the imaging systems includes a one-dimensional sensor array that captures an image of a linear image region on the receiver medium.

17. The imaging module of claim 16 wherein the illumination pattern includes a plurality of linear features that intersect the linear image region, at least some of the linear features having different slant angles.

18. The imaging module of claim 17 wherein the position of the illumination pattern in one of the captured images is determined by:
   analyzing the capture image to determine the intersection points where the linear features intersect the linear image region; and
   determining the position of the illumination pattern responsive to distances between the determined intersection points.

19. The imaging module of claim 1 wherein the imaging module is a component of a printing system that includes one or more printing modules for forming a printed image on the receiver medium, and wherein the imaging module is used to capture images of the receiver medium as it moves along a transport path in the printing system.

20. The imaging module of claim 19 wherein the program memory further stores instructions configured to cause the data processing system to implement a method for aligning printed images on the first and second sides of the receiver medium, wherein the method includes:
   using the one or more printing modules to print a first-side printed image on the first side of the receiver medium and to print a second-side printed image on the second side of the receiver medium;
   using the first imaging system to capture a first-side captured image of the first side of the receiver medium, the first-side captured image including at least a portion of the first-side printed image;
   using the second imaging system to capture a second-side captured image of the second side of the receiver medium, the second-side captured image including at least a portion of the second-side printed image;
   using the stored imaging system alignment parameters to align the first-side captured image with the second-side captured image,
   analyzing the aligned first-side captured image and the aligned second-side captured image to determine a relative printed image position of the first-side printed image and the second-side printed image;
   determining one or more printing system alignment parameters responsive to the determined relative printed image position; and
   adjusting the position of subsequent images printed using the one or more printing modules responsive to the printing system alignment parameters.

21. The imaging module of claim 20 wherein the first-side printed image and the second-side printed image include registration marks, and wherein the relative printed image position is determined responsive to the positions of the registration marks in the aligned first-side captured image and the aligned second-side captured image.

* * * * *